(12) United States Patent
Murata et al.

(10) Patent No.: US 7,662,498 B2
(45) Date of Patent: Feb. 16, 2010

(54) POLYMER ELECTROLYTE COMPOSITION CONTAINING AROMATIC HYDROCARBON-BASED RESIN

(75) Inventors: Hiroshi Murata, Yokohama (JP); Kimihiro Kubo, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 770 days.

(21) Appl. No.: 11/111,965

(22) Filed: Apr. 22, 2005

(65) Prior Publication Data

US 2006/0141315 A1    Jun. 29, 2006

(30) Foreign Application Priority Data

| Apr. 23, 2004 | (JP) | ............................. 2004-128181 |
| Aug. 18, 2004 | (JP) | ............................. 2004-238053 |
| Sep. 7, 2004 | (JP) | ............................. 2004-259595 |

(51) Int. Cl.
*H01M 8/10* (2006.01)
*H01M 6/18* (2006.01)
*C08J 5/20* (2006.01)

(52) U.S. Cl. .................... 429/33; 429/314; 429/316; 521/25; 521/27

(58) Field of Classification Search ........................ None
See application file for complete search history.

(56) References Cited

U.S. PATENT DOCUMENTS

| 4,218,542 | A | | 8/1980 | Ukihashi et al. |
| 5,523,181 | A | | 6/1996 | Stonehart et al. |
| 5,607,785 | A | * | 3/1997 | Tozawa et al. ................. 429/33 |
| 6,054,228 | A | * | 4/2000 | Cisar et al. .................... 429/18 |
| 6,054,230 | A | | 4/2000 | Kato |
| 2001/0041279 | A1 | * | 11/2001 | Terahara et al. ............... 429/33 |
| 2002/0045085 | A1 | | 4/2002 | Formato et al. |
| 2004/0122256 | A1 | * | 6/2004 | Ikeda et al. .................... 562/1 |
| 2005/0130006 | A1 | * | 6/2005 | Hoshi et al. ................... 429/30 |

FOREIGN PATENT DOCUMENTS

| EP | 0 094 679 | | 11/1986 |
| JP | 50-156561 | | 12/1975 |
| JP | 9-219206 | | 8/1997 |
| JP | 2000-80166 | | 3/2000 |
| JP | 2003-297393 | | 10/2003 |
| JP | 2004-273285 | | 9/2004 |
| JP | 2004-355959 | A | 12/2004 |
| JP | 2005-44611 | A | 2/2005 |

OTHER PUBLICATIONS

Machine translation of JP 2004-273285, Kidai et al.*
International Search Report mailed on Jul. 19, 2005 and issued in International Application No. PCT/JP2005/007633.

* cited by examiner

*Primary Examiner*—Dah-Wei D Yuan
*Assistant Examiner*—Kwang Han
(74) *Attorney, Agent, or Firm*—Staas & Halsey LLP

(57) ABSTRACT

An object of the present invention is to provide a polymer electrolyte composition ensuring high durability even under high-temperature low-humidification conditions (for example, an operation temperature of 100° C. with 50° C. humidification (corresponding to a humidity of 12 RH %)), and a proton exchange membrane comprising the polymer electrolyte composition. The present invention provides a polymer electrolyte composition comprising (A) a polymer compound having an ion exchange group, (B) a polyphenylene sulfide resin, and at least one resin selected from (C) a polyphenylene ether resin and (D) a polysulfone resin, and a proton exchange membrane comprising the above polymer electrolyte composition.

25 Claims, No Drawings

POLYMER ELECTROLYTE COMPOSITION CONTAINING AROMATIC HYDROCARBON-BASED RESIN

TECHNICAL FIELD

The present invention relates to a polymer electrolyte composition and a proton exchange membrane comprising the composition, which is used for solid polymer electrolyte fuel cells.

BACKGROUND OF THE INVENTION

A fuel cell is a cell in which hydrogen, methanol or the like is electrochemically oxidized and thereby the chemical energy of fuel is directly converted into an electric energy and taken out, and this is attracting attention as a clean electric energy supply source. In particular, a solid polymer electrolyte fuel cell works at a low temperature as compared with others and is expected to be an automobile alternative power source, a domestic cogeneration system, a portable generator or the like.

The solid polymer electrolyte fuel cell comprises at least a membrane electrode assembly in which a gas diffusion electrode obtained by stacking an electrode catalyst layer and a gas diffusion layer is joined on each of both surfaces of a proton exchange membrane. The proton exchange membrane as used herein means a material having a strongly acidic group such as sulfonic acid group and carboxylic acid group in the polymer chain and having a property of selectively passing a proton. The proton exchange membrane which is suitably used is a perfluoro-based proton exchange membrane as represented by Nafion (registered trademark, produced by du Pont) having high chemical stability.

During the operation of a fuel cell, a fuel (e.g., hydrogen) is supplied to the gas diffusion electrode on the anode side, an oxidizing agent (e.g., oxygen, air) is supplied to the gas diffusion electrode on the cathode side, and both electrodes are connected through an external circuit, thereby actuating the fuel cell. More specifically, when the fuel is hydrogen, the hydrogen is oxidized on an anode catalyst to produce a proton, and this proton passes through a proton conductive polymer in the anode catalyst layer, then moves in the proton exchange membrane and passes through a proton conductive polymer in the cathode catalyst layer to reach on the cathode catalyst. On the other hand, an electron produced simultaneously with the proton by the oxidation of hydrogen passes through the external circuit to reach the gas diffusion electrode on the cathode side and reacts with the proton and oxygen in the oxidizing agent to produce water, and an electric energy can be taken out at this time.

In this case, the proton exchange membrane must act also as a gas barrier and if the gas permeability of the proton exchange membrane is high, the hydrogen on the anode side leaks toward the cathode side and the oxygen on the cathode side leaks toward the anode side, that is, a cross leakage is generated, as a result, a so-called chemical short state is produced and a good voltage cannot be taken out.

The solid polymer electrolyte fuel cell is usually operated at around 80° C. in order to bring out high output properties, but in usage for automobiles, assuming travel of an automobile in the summer season, the fuel cell is required to be operable even under high-temperature low-humidification conditions (an operation temperature in the vicinity of 100° C. with 50° C. humidification (corresponding to a humidity of 12 RH %)). However, when a fuel cell using a conventional perfluoro-based proton exchange membrane is operated for a long time under high-temperature low-humidification conditions, this causes a problem in that pinholes are generated in the proton exchange membrane and cross-leakage is brought about, and sufficiently high durability is not obtained.

With respect to the method for enhancing the durability of the perfluoro-based proton exchange membrane, studies have been reported to enhance the durability by the reinforcement using a fibrillated polytetrafluoroethylene (PTFE) (see, Japanese Unexamined Patent Publication (Kokai) No. 53-149881 and Japanese Examined Patent Publication (Kokoku) No. 63-61337), the reinforcement using a stretched PTFE porous film (see, Kokai No. 8-162132), the reinforcement of adding inorganic particles (see, Kokai Nos. 6-111827 and 9-219206 and U.S. Pat. No. 5,523,181), or the reinforcement using a porous body comprising an aromatic ring-containing resin (see, Kokai Nos. 2001-514431 and 2003-297393). However, in these methods, durability sufficiently high to solve the above-described problems cannot be achieved.

SUMMARY OF THE INVENTION

An object of the present invention is to provide a polymer electrolyte composition ensuring high durability even under high-temperature low-humidification conditions (for example, an operation temperature of 100° C. with 50° C. humidification (corresponding to a humidity of 12 RH %)), and a proton exchange membrane comprising the polymer electrolyte composition.

As a result of intensive investigations to attain the above-described object, the present inventors have found that a polymer electrolyte composition comprising (A) a polymer compound having an ion exchange group, (B) a polyphenylene sulfide resin, and at least one resin selected from (C) a polyphenylene ether resin and (D) a polysulfone resin exhibits high oxidization stability, and a proton exchange membrane comprising this polymer electrolyte composition has excellent durability even at a high temperature with low humidification.

That is, the present invention is as follows.

[1] A polymer electrolyte composition comprising (A) a polymer compound having an ion exchange group, (B) a polyphenylene sulfide resin, and at least one resin selected from (C) a polyphenylene ether resin and (D) a polysulfone resin.

[2] A polymer electrolyte composition as described in [1] above, wherein the polyphenylene ether resin (C) is an epoxy-modified polyphenylene ether (E).

[3] A polymer electrolyte composition as described in [1] or [2] above, which comprises (A) a polymer compound having an ion exchange group, (B) a polyphenylene sulfide resin, (C) a polyphenylene ether resin and (F) an epoxy group-containing compound.

[4] A polymer electrolyte composition as described in [3] above, wherein the epoxy group-containing compound (F) is a homopolymer or copolymer of an unsaturated monomer having an epoxy group (G).

[5] A polymer electrolyte composition as described in [4] above, wherein the epoxy group-containing compound (F) is a copolymer comprising an unsaturated monomer having an epoxy group and a styrene monomer (G).

[6] A polymer electrolyte composition as described in [3] above, wherein the epoxy group-containing compound (F) is an epoxy resin (H).

[7] A polymer electrolyte composition as described in [6] above, which comprises (E) an epoxy-modified polyphenylene ether resulting from a reaction at least partially proceeding between the polyphenylene ether resin (C) and the epoxy resin (H) in the polymer electrolyte composition.

[8] A polymer electrolyte composition as described in any one of [1] to [7] above, wherein the polymer compound having an ion exchange group (A) is a perfluorocarbon polymer compound having an ion exchange group.

[9] A polymer electrolyte composition as described in [8] above, wherein the perfluorocarbon polymer compound having an ion exchange group has a structural unit represented by the following formula (1):

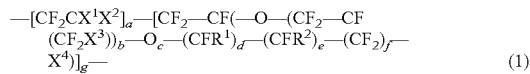

$$-[CF_2CX^1X^2]_a-[CF_2-CF(-O-(CF_2-CF(CF_2X^3))_b-O_c-(CFR^1)_d-(CFR^2)_e-(CF_2)_f-X^4)]_g- \quad (1)$$

wherein $X^1$, $X^2$ and $X^3$ each is independently a halogen atom or a perfluoroalkyl group having from 1 to 3 carbon atoms, a and g are $0 \leq a < 1$, $0 < g \leq 1$ and $a+g=1$, b is an integer of 0 to 8, c is 0 or 1, d, e and f each is independently an integer of 0 to 6 (with the proviso that d+e+f is not 0), $R^1$ and $R^2$ each is independently a halogen element or a perfluoroalkyl or fluorochloroalkyl group having from 1 to 10 carbon atoms, and $X^4$ is COOZ, $SO_3Z$, $PO_3Z_2$ or $PO_3HZ$ (wherein Z is a hydrogen atom, an alkali metal atom, an alkaline earth metal atom or an amine (e.g., $NH_4$, $NH_3R_1$, $NH_2R_1R_2$, $NHR_1R_2R_3$, $NR_1R_2R_3R_4$), and $R_1$, $R_2$, $R_3$ and $R_4$ each is an alkyl group or an arene group).

[10] A polymer electrolyte composition as described in any one of [1] to [9] above, wherein particles comprising one or more resin selected from the polyphenylene sulfide resin (B), the polyphenylene ether resin (C) and the polysulfone resin (D) are dispersed in the polymer compound having an ion exchange group (A), and the equivalent-circle average particle diameter of the particles is 1 μm or less.

[11] A polymer electrolyte composition as described in any one of [3] to [9] above, wherein particles comprising one or more resin selected from the polyphenylene sulfide resin (B), the polyphenylene ether resin (C) and the epoxy group-containing compound (F) are dispersed in the polymer compound having an ion exchange group (A), and the equivalent-circle average particle diameter of the particles is 1 μm or less.

[12] A polymer electrolyte composition as described in [10] or [11], wherein the region allowing for dispersion of particles occupies from 50 to 100% in the entire region of the polymer electrolyte composition.

[13] A proton exchange membrane comprising the polymer electrolyte composition described in any one of [1] to [12] above.

[14] A proton exchange membrane as described in [13] above, wherein the membrane has a thickness of 5 to 200 μm; the polymer compound having an ion exchange group (A) is a perfluorocarbon polymer compound having an ion exchange group; and the polyphenylene sulfide resin (B) and at least one resin selected from the polyphenylene ether resin (C) and the polysulfone resin (D) are melt-mixed under heating with a precursor of the perfluorocarbon polymer compound having an ion exchange group and then extrusion-molded, and the obtained film is saponified with an alkali and then acid-treated, thereby producing the proton exchange membrane.

[15] A proton exchange membrane as described in [13] above, wherein the membrane has a thickness of 5 to 200 μm; the polymer compound having an ion exchange group (A) is a perfluorocarbon polymer compound having an ion exchange group; and the polyphenylene sulfide resin (B), the polyphenylene ether resin (C) and the epoxy group-containing compound (F) are melt-mixed under heating with a precursor of the perfluorocarbon polymer compound having an ion exchange group and then extrusion-molded, and the obtained film is saponified with an alkali and then acid-treated, thereby producing the proton exchange membrane.

[16] A proton exchange membrane as described in [14] or [15] above, wherein the extrusion molding is inflation molding.

[17] A proton exchange membrane as described in any one of [13] to [16] above, which is stretched at a draw ratio of 1.1 to 6.0 times in the transverse direction (TD), at a draw ratio of 1.0 to 6.0 times in the machine direction (MD) and at an area draw ratio of 1.1 to 36 times.

[18] A proton exchange membrane as described in any one of [13] to [17] above, wherein at least two proton exchange membranes differing in the compositional ratio of the polymer electrolyte composition are stacked.

[19] A proton exchange membrane as described in [18] above, wherein the polymer electrolyte composition comprises (A) the polymer compound having an ion exchange group, (B) the polyphenylene sulfide resin, (C) the polyphenylene ether resin and (F) the epoxy group-containing compound.

[20] A proton exchange membrane as described in [18] or [19], wherein a proton exchange membrane comprising at least two polymer electrolyte compositions differing in the content of the polymer compound having an ion exchange group (A) is stacked at least in three layers, and the inner layer smaller in the A content than at least either one surface layer occupies from 5 to 90% of the entire layer thickness.

[21] A proton exchange membrane as described in [18] or [19], wherein a proton exchange membrane comprising at least two polymer electrolyte compositions differing in the content of the polymer compound having an ion exchange group (A) is stacked at least in three layers, the surface layer is lower in the A content than in the inner layer, and the thickness of the surface layer occupies from 5 to 50% of the entire layer thickness.

[22] A proton exchange membrane as described in any one of [13] to [21], which comprises a reinforcing material comprising an inorganic or organic material.

[23] A proton exchange membrane as described in [22] above, wherein the reinforcing material is a staple fiber substance.

[24] A proton exchange membrane as described in [22] above, wherein the reinforcing material is a continuous support.

[25] A membrane electrode assembly comprising the proton exchange membrane described in any one of [13] to [24] above.

[26] A solid polymer electrolyte fuel cell comprising the membrane electrode assembly described in [25] above.

The proton exchange membrane comprising the polymer electrolyte composition of the present invention is free from generation of cross-leakage and exhibits excellent durability even when a fuel cell is operated for a long time at an operation temperature of 100° C. with 50° C. humidification (corresponding to a humidity of 12 RH %), so that a proton exchange membrane ensuring high durability even under high-temperature low-humidification conditions (for example, an operation temperature of 100° C. with 50° C. humidification (corresponding to a humidity of 12 RH %)) can be obtained.

The proton exchange membrane obtained according to the present invention is usable also for various fuel cells including a direct methanol-type fuel cell as well as for water electrolysis, hydrogen halide acid electrolysis, sodium chloride electrolysis, oxygen concentrator, moisture sensor, gas sensor and the like.

DETAILED DESCRIPTION OF THE INVENTION

The present invention is described in detail below.

The polymer compound having an ion exchange group (A) for use in the present invention is preferably, for example, a perfluorocarbon polymer compound having an ion exchange group, or a hydrocarbon-based polymer compound having an aromatic ring within the molecule, in which an ion exchange group is introduced. Specific examples of the hydrocarbon-based polymer having an aromatic ring within the molecule include pqlyphenylene sulfide, polyphenylene ether, polysulfone, polyethersulfone, polyether ether sulfone, polyether ketone, polyether ether ketone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide, polyetherimide, polyesterimide, polyamidoimide, polyarylate, aromatic polyamide, polystyrene, polyester and polycarbonate. Among these, in view of resistance against heat, oxidation and hydrolysis, preferred are polyphenylene sulfide, polyphenylene ether, polysulfone, polyethersulfone, polyether ether sulfone, polyether ketone, polyether ether ketone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide and polyetherimide. The ion exchange group introduced into these compounds is, for example, preferably a sulfonic acid group, a sulfonimide group, a sulfonamide group, a carboxylic acid group or a phosphoric acid group, more preferably a sulfonic acid group.

In particular, the polymer compound having an ion exchange group (A) for use in the present invention is preferably a perfluorocarbon polymer compound having an ion exchange group.

Suitable examples of the perfluorocarbon polymer compound having an ion exchange group include sulfonic acid polymer, carboxylic acid polymer, sulfonimide polymer, sulfonamide polymer and phosphoric acid polymer of perfluorocarbon, and amine salts and metal salts thereof. Specific examples thereof include a polymer represented by the following formula (1):

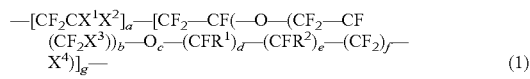  (1)

wherein $X^1$, $X^2$ and $X^3$ each is independently a halogen atom or a perfluoroalkyl group having from 1 to 3 carbon atoms, a and g are $0 \leq a < 1$, $0 < g \leq 1$ and $a+g=1$, b is an integer of 0 to 8, c is 0 or 1, d, e and f each is independently an integer of 0 to 6 (with the proviso that d+e+f is not 0), $R^1$ and $R^2$ each is independently a halogen element or a perfluoroalkyl or fluorochloroalkyl group having from 1 to 10 carbon atoms, and $X^4$ is COOZ, $SO_3Z$, $PO_3Z_2$ or $PO_3HZ$ (wherein Z is a hydrogen atom, an alkali metal atom, an alkaline earth metal atom or an amine (e.g., $NH_4$, $NH_3R_1$, $NH_2R_1R_2$, $NHR_1R_2R_3$, $NR_1R_2R_3R_4$), and $R_1$, $R_2$, $R_3$ and $R_4$ each is an alkyl group or an arene group).

In particular, a perfluorocarbonsulfonic acid polymer represented by the following formula (2) or (3) or a metal salt thereof is preferred:

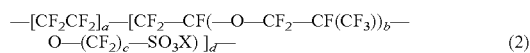  (2)

wherein a and d are $0 \leq a < 1$, $0 \leq d < 1$ and $a+d=1$, b is an integer of 1 to 8, c is an integer of 0 to 10, and X is a hydrogen atom or an alkali metal atom;

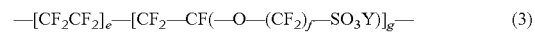  (3)

wherein e and g are $0 \leq e < 1$, $0 \leq g \leq 1$ and $e+g=1$, f is an integer of 0 to 10, and Y is a hydrogen atom or an alkali metal atom.

The perfluorocarbon polymer compound having an ion exchange group for use in the present invention can be produced, for example, by polymerizing a precursor polymer represented by the following formula (4) and then subjecting the polymer to alkali hydrolysis, acid treatment and the like:

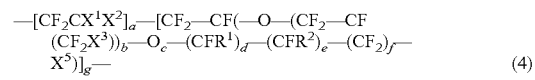  (4)

wherein $X^1$, $X^2$ and $X^3$ each independently represents a halogen atom or a perfluoroalkyl group having from 1 to 3 carbon atoms, a and g are $0 \leq a < 1$, $0 < g \leq 1$ and $a+g=1$, b is an integer of 0 to 8, c is 0 or 1, d, e and f each is independently an integer of 0 to 6 (with the proviso that d+e+f is not 0), $R^1$ and $R^2$ each is independently a halogen atom or a perfluoroalkyl or fluorochloroalkyl group having from 1 to 10 carbon atoms, and $X^5$ is $COOR^3$, $COR^4$ or $SO_2R^4$ (wherein $R^3$ is a hydrocarbon-based alkyl group having from 1 to 3 carbon atoms and $R^4$ is a halogen element).

The precursor polymer which can be used in the present invention is produced by copolymerizing a fluorinated olefin compound and a vinyl fluoride compound.

Specific examples of the fluorinated olefin compound include $CF_2=CF_2$, $CF_2=CFCl$ and $CF_2=CCl_2$.

Specific examples of the vinyl fluoride compound include $CF_2=CFO(CF_2)_z-SO_2F$, $CF_2=CFOCF_2CF(CF_3)O(CF_2)_z-SO_2F$, $CF_2=CF(CF_2)_z-SO_2F$, $CF_2=CF(OCF_2CF(CF_3))_z-(CF_2)_{z-1}-SO_2F$, $CF_2=CFO(CF_2)_z-CO_2R$, $CF_2=CFOCF_2CF(CF_3)O(CF_2)_z-CO_2R$, $CF_2=CF(CF_2)_z-CO_2R$ and $CF_2=CF(OCF_2CF(CF_3))_z-(CF_2)_2-CO_2R$ (wherein Z represents an integer of 1 to 8, and R represents a hydrocarbon-based alkyl group having from 1 to 3 carbon atoms).

Examples of the polymerization method for the precursor polymer include general polymerization methods such as a solution polymerization method of dissolving a vinyl fluoride compound in a solvent (e.g., fluorocarbon), and reacting the solution with a fluorinated olefin compound gas, thereby effecting the polymerization; a bulk polymerization method of polymerizing these compounds without use of a solvent (e.g., fluorocarbon); and an emulsion polymerization method of charging a vinyl fluoride compound together with a surfactant into water and, after emulsifying it, reacting it with a fluorinated olefin compound gas, thereby effecting the polymerization.

Incidentally, the precursor polymer for use in the present invention may be a copolymer containing a third component in addition to a vinyl fluoride compound and a fluorinated olefin compound, for example, containing a perfluoroolefin such as hexafluoropropylene and chlorotrifluoroethylene, or a perfluoroalkylvinyl ether.

The precursor polymer usable in the present invention preferably has a melt index MI (g/10 min) of 0.001 to 1,000, more preferably from 0.01 to 100, and most preferably from 0.1 to 10, as measured according to JIS K-7210 at 270° C. under a load of 21.2N with an orifice inner diameter of 2.09 mm.

The precursor polymer usable in the present invention is then subjected to an alkali hydrolysis treatment of dipping it in a basic reactive liquid. The reactive liquid is preferably an aqueous solution of a hydroxide of an alkali metal or an alkaline earth metal, such as potassium hydroxide and sodium hydroxide. The content of the hydroxide of an alkali metal or an alkaline earth metal is preferably from 10 to 30 mass %. The reactive liquid preferably contains a swelling organic compound such as dimethylsulfoxide and methanol. The content of the swelling organic compound is preferably from 1 to 30 mass %.

After the alkali hydrolysis treatment, the precursor polymer is, if desired, further treated with an acid such as hydrochloric acid, whereby a perfluorocarbon polymer compound having an ion exchange group is produced.

The polyphenylene sulfide resin (B) (hereinafter sometimes simply referred to as "PPS") for use in the present invention is not particularly limited, as long as it is a so-called polyphenylene sulfide resin, but is preferably a polyphenylene sulfide resin in which the paraphenylene sulfide skeleton occupies 70 mol % or more, more preferably 90 mol % or more.

The PPS is not particularly limited in its production method, but examples of the production method usually employed include a method of polymerizing a halogen-substituted aromatic compound (e.g., p-dichlorobenzene) in the presence of sulfur and sodium carbonate, a method of polymerizing p-dichlorobenzene with sodium sulfide or sodium hydrogensulfide in a polar solvent in the presence of sodium hydroxide, a method of polymerizing p-dichlorobenzene with hydrogen sulfide in a polar solvent in the presence of sodium hydroxide or sodium aminoalkanoate, and a self-condensation of p-chlorothiophenol. Among these, preferred is a method of reacting sodium sulfide with p-dichlorobenzene in an amide-based solvent such as N-methylpyrrolidone and dimethylacetamide, or a sulfone-based solvent such as sulfolane. Specific examples thereof include the methods described in U.S. Pat. No. 2,513,188, Japanese Examined Patent Publication (Kokoku) Nos. 44-27671, 45-3368 and 52-12240, Japanese Unexamined Patent Publication (Kokai) No. 61-225217, U.S. Pat. No. 3,274,165, British Patent No. 1,160,660, Kokoku No. 46-27255, Belgian Patent No. 29437 and Kokai No. 5-222196, and the methods described in prior arts cited in these patent publications.

The polyphenylene sulfide resin (B) for use in the present invention is preferably a polyphenylene sulfide resin in which the amount of oligomer extracted with methylene chloride is from 0.001 to 0.9 wt % and the -SX group (wherein S is a sulfur atom and X is an alkali metal or a hydrogen atom) concentration is from 10 to 10,000 μmol/g.

The amount of oligomer extracted with methylene chloride is preferably from 0.001 to 0.8 wt %, more preferably from 0.001 to 0.7 wt %. When the amount of oligomer extracted with methylene chloride is in such a range, this means that the amount of oligomer (from about 10-to 30-mer) in PPS is small. If the amount of oligomer extracted exceeds the above-described range, bleed-out is readily generated at the film formation and this is not preferred.

The amount of oligomer extracted with methylene chloride can be measured by the following method. That is, 5 g of PPS powder is added to 80 ml of methylene chloride, subjected to Soxhlet extraction for 4 hours and then cooled to room temperature, and the methylene chloride solution after extraction is transferred to a weighing bottle. The vessel used for the extraction is washed in three parts with 60 ml in total of methylene chloride, and the washing solution is recovered in the weighing bottle. Thereafter, methylene chloride in the weighing bottle is evaporated and thereby removed under heating at about 80° C., and the residue is weighed. From the amount of residue, the ratio of the amount of oligomer present in PPS can be determined.

The content of the -SX group is more preferably from 15 to 10,000 μmol/g, most preferably from 20 to 10,000 μmol/g. When the -SX group concentration is in such a range, this means that the polyphenylene sulfide resin has a large number of reaction active sites. Use of a polyphenylene sulfide resin having an -SX group concentration satisfying the above-described range is considered to have the effect of enhancing the miscibility of the polymer compound having an ion exchange group (A) with the polyphenylene sulfide resin (B) in the polymer electrolyte composition of the present invention and in turn, enhancing the dispersibility of the polyphenylene sulfide resin (B) in the polymer compound having an ion exchange group (A).

The content of the -SX group can be determined by the following method. That. is, PPS powder is previously dried at 120° C. for 4 hours, and 20 g of the dried PPS powder is added to 150 g of N-methyl-2-pyrrolidone and mixed with vigorous stirring at room temperature for 30 minutes to eliminate powder aggregates and produce a slurry state. The obtained slurry is filtered and repeatedly washed 7 times by using 1 liter of warm water at about 80° C. every each washing. The obtained filter cake is again formed into a slurry in 200 g of pure water, and the slurry is adjusted to a pH of 4.5 by adding 1N hydrochloric acid, then stirred at 25° C. for 30 minutes, filtered and repeatedly washed 6 times by using 1 liter of warm water at about 80° C. The obtained filter cake is again formed into a slurry in 200 g of pure water and by performing titration with 1N sodium hydroxide, the amount of the -SX group present in PPS is determined from the amount of sodium hydroxide consumed.

Specific examples of the production method for PPS in which the amount of oligomer extracted with methylene oxide is from 0.001 to 0.9 wt % and the -SX group concentration is from 10 to 10,000 μmol/g include the production method described in Examples 1 and 2 (paragraphs 0041 to 0044) of Japanese Unexamined Patent Publication (Kokai) No. 8-253587 and the production method described in Synthesis Examples 1 and 2 (paragraphs 0046 to 0048) of Kokai No. 11-106656.

The PPS for use in the present invention preferably has a melt viscosity (a value measured by using a flow tester and keeping the PPS at 300° C. under a load of 196N with L/D (L: orifice length, D: orifice inner diameter)=10/1 for 6 minutes) at 320° C. of 1 to 10,000 poise, more preferably from 100 to 10,000 poise.

In the present invention, a polyphenylene sulfide resin having introduced thereinto an acidic functional group or a reactive functional group can also be suitably used as the polyphenylene sulfide resin (B). Introduction of such a functional group is considered to give an effect of enhancing the miscibility of the polymer compound having an ion exchange group (A) with the polyphenylene sulfide resin (B) in the polymer electrolyte composition of the present invention and in turn, enhancing the dispersibility of the polyphenylene sulfide resin (B) in the polymer compound having an ion exchange group (A). In particular, when an acidic functional group is introduced, this means that the number of functional groups participating in the proton conductivity in the proton exchange membrane comprising the polymer electrolyte of the present invention is increased, and high proton conductivity can be advantageously expressed. Preferred examples of the acidic functional group introduced include a sulfonic acid group, a phosphoric acid group, a sulfonimide group, a carboxylic acid group, a maleic acid group, a maleic anhydride group, a fumaric acid group, an itaconic acid group, an acrylic acid group and a methacrylic acid group. Among these, more preferred are a sulfonic acid group and a phosphoric acid group, which are a strong acid group, and most preferred is a sulfonic acid group. Preferred examples of the reactive functional group introduced include an epoxy group, an oxazonyl group, an amino group, an isocyanate group and a carbodiimide group. Among these, an epoxy group is more preferred. Also, two or more of these various functional groups may be introduced.

The method for introducing the acidic functional group or reactive functional group is not particularly limited and such a functional group can be introduced by a general method. For example, a sulfonic acid group can be introduced by using a sulfonating agent such as sulfuric anhydride and fuming sulfuric acid, under known conditions such as conditions described in K. Hu, T. Xu, W. Yang and Y. Fu, *Journal of Applied Polymer Science*, Vol. 91, and E. Montoneri, *Journal of Polymer Science : Part A: Polymer Chemistry*, Vol. 27, 3043-3051 (1989).

Furthermore, a polyphenylene sulfide resin where the acidic functional group introduced is replaced with a metal salt or an amine salt is also preferably used. The metal salt is preferably an alkali metal salt such as sodium salt and potassium salt, or an alkaline earth metal salt such as calcium salt.

The polyphenylene ether resin (hereinafter sometimes simply referred to as "PPE") (C) for use in the present invention is not particularly limited as long as it is a so-called polyphenylene ether resin, but this resin is preferably a phenol homopolymer or copolymer containing a structural unit represented by the following formula (5) in a proportion of 70 mol % or more, preferably 90 mol % or more:

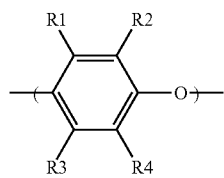

(5)

wherein R1, R2, R3 and R4 may be the same or different and each is a substituent selected from the group consisting of hydrogen, a halogen, a linear or branched lower alkyl group having from 1 to 7 carbon atoms, a phenyl group, a haloalkyl group, an aminoalkyl group, an oxy-hydrocarbon group and an oxy-halohydrocarbon group with at least two carbon atoms separating a halogen atom from an oxygen atom.

Specific examples of the PPE include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether), and further include a copolymer of 2,6-dimethylphenol with other monovalent phenols (e.g., 2,3,6-trimethylphenol, 2-methyl-6-butylphenol), and a copolymer of 2,6-dimethylphenol with divalent phenols (e.g., 3,3', 5,5'-tetramethyl bisphenol A). Among these, preferred are poly(2,6-dimethyl-1,4-phenylene ether), a copolymer of 2,6-dimethylphenol and 2,3,6-trimethylphenol, and a copolymer of 2,6-dimethylphenol and 3,3', 5,5'-tetramethyl bisphenol A.

The polyphenylene ether resin (C) for use in the present invention preferably has a phenolic hydroxyl group at the molecular chain end, and the position thereof may be either one end or both ends.

The reduced viscosity (measured with 0.5 g/dl of chloroform solution at 30° C.) of the polyphenylene ether resin (C) for use in the present invention is preferably from 0.05 to 2.0 dl/g, more preferably from 0.10 to 0.8 dl/g.

The polyphenylene ether resin (C) for use in the present invention is not particularly limited in its production method and can be easily produced, for example, by a method described in U.S. Pat. No. 3,306,874 where, for example, 2,6-dimethylphenol is oxidation-polymerized by using a complex of cuprous salt and amine as a catalyst. In addition, the polyphenylene ether resin can be easily prepared by the methods described in U.S. Pat. Nos. 3,306,875, 3,257,357 and 3,257,358, Japanese Examined Patent Publication (Kokoku) No. 52-17880, and Japanese Unexamined Patent Publication (Kokai) Nos. 50-51197 and 63-152628.

In the present invention, a polyphenylene ether resin having introduced thereinto an acidic functional group or a reactive functional group can also be suitably used as the polyphenylene ether resin (C). Introduction of such a functional group is considered to give an effect of enhancing the miscibility of the polymer compound having an ion exchange group (A) with the polyphenylene ether resin (C) in the polymer electrolyte composition of the present invention and in turn, enhancing the dispersibility of the polyphenylene ether resin (C) in the polymer compound having an ion exchange group (A). In particular, when an acidic functional group is introduced, this means that the number of functional groups participating in the proton conductivity in the proton exchange membrane comprising the polymer electrolyte of the present invention is increased, and high proton conductivity can be advantageously expressed. Preferred examples of the acidic functional group introduced include a sulfonic acid group, a phosphoric acid group, a sulfonimide group, a carboxylic acid group, a maleic acid group, a maleic anhydride group, a fumaric acid group, an itaconic acid group, an acrylic acid group and a methacrylic acid group. Among these, more preferred are a sulfonic acid group and a phosphoric acid group, which are a strong acid group, and most preferred is a sulfonic acid group. Preferred examples of the reactive functional group introduced include an epoxy group, an oxazonyl group, an amino group, an isocyanate group and a carbodiimide group. Among these, an epoxy group is more preferred. Also, two or more of these various functional groups may be introduced.

The method for introducing the acidic functional group or reactive functional group is not particularly limited and such a functional group can be introduced by a general method. For example, a sulfonic acid group can be introduced by using a sulfonating agent such as sulfuric anhydride and fuming sulfuric acid, under known conditions such as conditions described C. Wang, Y. Huang and G. Cong, *Polymer Journal*, Vol. 27, No. 2, 173-178 (1995), and J. Schauer, W. Albrecht and T. Weigel, *Journal of Applied Polymer Science*, Vol. 73, 161-167 (1999).

Furthermore, a polyphenylene ether resin where the acidic functional group introduced is replaced with a metal salt or an amine salt is also preferably used. The metal salt is preferably an alkali metal salt such as sodium salt and potassium salt, or an alkaline earth metal salt such as calcium salt.

The polysulfone resin (D) for use in the present invention is not particularly limited as long as it is a so-called polysulfone resin, but this resin is preferably a polysulfone resin containing a structure represented by the following formula (6) in a proportion of 80 mol % or more, preferably 90 mol % or more.

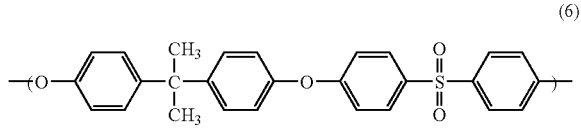

(6)

The polysulfone resin (D) for use in the present invention is not particularly limited in its production method and can be easily produced, for example, by reacting a sodium salt of bisphenol A with 4,4'-dichlorodiphenylsulfone.

In the present invention, a polysulfone resin having introduced thereinto an acidic functional group or a reactive functional group can also be suitably used as the polysulfone resin (D). Introduction of such a functional group is considered to give an effect of enhancing the miscibility of the polymer compound having an ion exchange group (A) with the polysulfone resin (D) in the polymer electrolyte composition of the present invention and in turn, enhancing the dispersibility of the polysulfone resin (D) in the polymer compound having an ion exchange group (A). In particular, when an acidic functional group is introduced, this means that the number of functional groups participating in the proton conductivity in the proton exchange membrane comprising the polymer electrolyte of the present invention is increased, and high proton conductivity can be advantageously expressed. Preferred examples of the acidic functional group introduced include a sulfonic acid group, a phosphoric acid group, a sulfonimide group, a carboxylic acid group, a maleic acid group, a maleic anhydride group, a fumaric acid group, an itaconic acid group, an acrylic acid group and a methacrylic acid group. Among these, more preferred are a sulfonic acid group and a phosphoric acid group, which are a strong acid group, and most preferred is a sulfonic acid group. Preferred examples of the reactive functional group introduced include an epoxy group, an oxazonyl group, an amino group, an isocyanate group and a carbodiimide group. Among these, an epoxy group is more preferred. Also, two or more of these various functional groups may be introduced.

The method for introducing the acidic functional group or reactive functional group is not particularly limited and such a functional group can be introduced by a general method. For example, a sulfonic acid group can be introduced by using a sulfonating agent such as sulfuric anhydride and fuming sulfuric acid, under known conditions.

Furthermore, a polysulfone resin where the acidic functional group introduced is replaced with a metal salt or an amine salt is also preferably used. The metal salt is preferably an alkali metal salt such as sodium salt and potassium salt, or an alkaline earth metal salt such as calcium salt.

The polymer electrolyte composition of the present invention is a composition comprising these (A) polymer compound having an ion exchange group, (B) polyphenylene sulfide resin and at least one resin selected from (C) polyphenylene ether resin and (D) polysulfone resin. Such a polymer electrolyte composition of the present invention and a proton exchange membrane comprising this composition are remarkably enhanced in the durability as compared with the case of using solely the polymer compound having an ion exchange group (A) or as compared with the case of introducing solely the polyphenylene sulfide resin (B), the polyphenylene ether resin (C) or the polysulfone resin (D) into the polymer compound having an ion exchange group (A). Furthermore, surprisingly, the polymer electrolyte composition of the present invention is remarkably enhanced in durability even when compared with the case of incorporating many resins including the resins used in the present invention in various combinations, except for the combination of the present invention, into the polymer compound having an ion exchange group (A).

The compositional ratio of the polymer compound having an ion exchange group (A), the polyphenylene sulfide resin (B), the polyphenylene ether resin (C) and the polysulfone resin (D) in the polymer electrolyte composition of the present invention is described below.

In the polymer electrolyte composition of the present invention, the mass ratio of the polyphenylene sulfide resin (B) to the polyphenylene ether resin (C) and/or the polysulfone resin (D) is preferably B/(C+D)=1/99 to 99/1, more preferably B/(C+D)=20/80 to 95/5, and most preferably B/(C+D)=30/70 to 90/10.

The mass ratio ((B+C+D)/A) of the polyphenylene sulfide resin (B), polyphenylene ether resin (C) and polysulfone resin (D) to the polymer compound having an ion exchange group (A) is preferably from 99/1 to 0.01/99.99. In view of the balance between proton conductivity and durability, (B+C+D)/A is more preferably from 90/10 to 0.05/99.95, still more preferably from 70/30 to 0.1/99.9, yet still more preferably from 50/50 to 1/99, and most preferably from 30/70 to 5/95.

In the case where the polymer electrolyte composition of the present invention contains the polyphenylene ether resin (C), the composition preferably contains an epoxy group-containing compound (F). When the polymer electrolyte composition comprising at least the polymer compound having an ion exchange group (A), the polyphenylene sulfide resin (B) and the polyphenylene ether resin (C) contains an epoxy group-containing compound (F), the particle dispersibility in the polymer electrolyte composition is enhanced and in turn, the polymer electrolyte composition and a proton exchange membrane comprising this composition are more enhanced in the durability.

The epoxy group-containing compound (F) for use in the present invention is not particularly limited as long as it is a compound having an epoxy group, and examples thereof include a low molecular compound containing an epoxy group, (G) a homopolymer or copolymer of an unsaturated monomer having an epoxy group, and (H) an epoxy resin. Among these, (G) a homopolymer or copolymer of an unsaturated monomer having an epoxy group, and (H) an epoxy resin are preferred, because a polymer compound is easier to handle at high temperatures.

The low molecular compound having an epoxy group is preferably a solid or a liquid at 200° C., and specific examples thereof include 1,2-epoxy-3-phenoxypropane, N-(2,3-epoxypropyl)phthalimide, 3,4-epoxytetrahydrothiophene-1,1-dioxide, glycidyl 4-nonylphenyl ether, glycidyl tosylate and glycidyl trityl ether.

The content of the epoxy group-containing compound (F) is, based on the total mass of the polyphenylene sulfide resin (B) and the polyphenylene ether resin (C), preferably F/(B+C)=1/100 to 200/100, more preferably F/(B+C)=2/100 to 100/100, still more preferably F/(B+C)=3/100 to 50/100.

In the homopolymer or copolymer of an unsaturated monomer having an epoxy group (G) for use in the present invention, the unsaturated monomer having an epoxy group constituting the homopolymer or copolymer is not particularly limited, as long as it is an unsaturated monomer having an epoxy group, and examples thereof include glycidyl methacrylate, glycidyl acrylate, vinyl glycidyl ether, glycidyl ether of hydroxyalkyl (meth)acrylate, glycidyl ether of polyalkylene glycol (meth)acrylate, and glycidyl itaconate. Among these, glycidyl methacrylate is preferred.

In the case of the copolymer of an unsaturated monomer having an epoxy group, preferred examples of the other unsaturated monomer copolymerized with the unsaturated monomer having an epoxy group include vinyl aromatic compounds (e.g., styrene), vinyl cyanide monomers (e.g., acrylonitrile), vinyl acetate and (meth)acrylic acid esters. Examples of the copolymer obtained by the copolymerization with such a copolymerizable unsaturated monomer include a styrene-glycidyl methacrylate copolymer, a styrene-glycidyl methacrylate-methyl methacrylate copolymer, and a styrene-glycidyl methacrylate-acrylonitrile copolymer.

Among these copolymers, a copolymer containing an unsaturated monomer having an epoxy group and a styrene monomer is preferred, because this copolymer has excellent affinity particularly for the polyphenylene ether resin (C) and the dispersibility of particularly the polyphenylene ether resin (C) is enhanced. From the standpoint of enhancing the dispersibility, the copolymer preferably contains a styrene monomer in a proportion of at least 65 mass %. Also, the copolymer preferably contains the unsaturated monomer having an epoxy group, in a proportion of 0.3 to 20 mass %, more preferably from 1 to 15 mass %, still more preferably from 3 to 10 mass %.

Examples of the epoxy resin (H) for use in the present invention include cresol novolak-type epoxy resin, bisphenol A-type epoxy resin, bisphenol F-type epoxy resin, bisphenol S-type epoxy resin, hydantoin-type epoxy resin, biphenyl-type epoxy resin, alicyclic epoxy resin, triphenylmethane-type epoxy resin and phenol novolak-type epoxy resin. One resin selected from these may be used or a mixture of two or more thereof may be used. Among these resins, a cresol novolak-type epoxy resin and a bisphenol A-type epoxy resin are preferred, and a cresol novolak-type epoxy resin is more preferred.

In the present invention, the polyphenylene ether resin (C) and the epoxy resin (H) may be added after previously mixing and reacting these resins. That is, an epoxy-modified polyphenylene ether resin (E) obtained by reacting a polyphenylene ether resin and an epoxy resin can be used as the polyphenylene ether resin (C). Of course, after mixing the polyphenylene ether resin (C) and the epoxy resin (H) together with the components (A) and (B) to prepare the composition of the present invention, the polyphenylene ether resin (C) and the epoxy resin (H) may be reacted under the conditions described later.

When the epoxy-modified polyphenylene ether resin (E) is used as the polyphenylene ether resin (C), the dispersibility of the obtained polymer electrolyte composition is enhanced and in turn, the polymer electrolyte composition and a proton exchange membrane comprising this composition are more enhanced in the durability.

As for the production method of the epoxy-modified polyphenylene ether resin (E), the reaction temperature is preferably from 100 to 250° C., more preferably from 120 to 195° C., still more preferably from 140 to 190° C., and the reaction time is preferably less than 3 hours, more preferably 2 hours or less, still more preferably 40 minutes or less.

The reactor used for the production of the epoxy-modified polyphenylene ether resin (E) is preferably a reactor where a polyphenylene ether resin and an epoxy resin can be uniformly mixed, stirred or kneaded. In the case where the viscosity is high, a kneading machine such as twin screw extruder and kneader may be used. The production method may employ any process form of a continuous reaction process, a batch reaction process and a semi-batch reaction process.

In the production method of the epoxy-modified polyphenylene ether resin (E), a basic compound may be added to the reaction system from the standpoint of increasing the reaction rate, preventing the side reaction or controlling the structure of product composition E. Specific examples of the basic compound include lithium, sodium, potassium, sodium methylate, sodium ethylate, tertiary amine (e.g., triethylamine, tributylamine), imidazole, sodium phenoxide, lithium hydroxide, sodium hydroxide, potassium hydroxide, potassium carbonate and sodium carbonate. Among these, preferred are sodium methylate, triethylamine, tributylamine and sodium hydroxide. Other than these basic compounds, a quaternary ammonium salt can also be used as the catalyst.

In the present invention, the components (A) to (H) each may comprise two or more compounds. For example, a mixture of poly(2,6-dimethyl-1,4-phenylene ether) and poly(2-methyl-6-ethyl-1,4-phenylene ether) or a mixture of poly(2,6-dimethyl-1,4-phenylene ether) and poly(2,6-dimethyl-1,4-phenylene ether) having introduced thereinto a sulfonic acid group may be used as the polyphenylene ether resin (C), and a mixture of polyphenylene sulfide and sulfonated polyphenylene sulfide may be used as the polyphenylene sulfide resin (B).

In the polymer electrolyte composition of the present invention, various additives such as antioxidant, age resistor, heavy metal inactivating agent and flame retardant may be added, if desired. The weight ratio (electrolyte composition/additive) of the polymer electrolyte composition of the present invention to the additive is preferably from 80/20 to 99.999/0.001, more preferably from 90/10 to 99.99/0.01, still more preferably from 95/5 to 99.9/0.1.

The method for manufacturing the polymer electrolyte composition of the present invention is described below. The polymer electrolyte composition of the present invention is obtained by mixing the components selected from the components (A) to (H), but the method therefor is not particularly limited and a general mixing method for polymer compositions can be suitably applied.

For example, a method of heat-melting the polymer compound having an ion exchange group (A) or a precursor polymer thereof and the components selected from the components (B) to (H), and kneading the melt by a kneading-extruder, Labo Plastomill, a kneading roll, a Banbury mixer or the like may be used. Alternatively, after the components selected from the components (B) to (H) are heat-melted and kneaded by a kneading-extruder, Labo Plastomill, a kneading roll, a Banbury mixer or the like to obtain a mixture, the obtained mixture may be similarly kneaded with the polymer compound having an ion exchange group (A) or a precursor polymer thereof to obtain a final polymer electrolyte composition. The combination and order of kneading operations can be freely selected. Incidentally, in the case of using a precursor polymer in place of the polymer compound having an ion exchange group (A), the polymer electrolyte composition of the present invention can be obtained by performing an alkali hydrolysis treatment and an acid treatment after kneading to convert the composition into a form having an ion exchange group.

The kneading at this time can be achieved by using a conventionally known technique such as Brabender, kneader, Banbury mixer and extruder. In particular, when an extruder is used, fine dispersion of other components in the polymer compound having an ion exchange group (A) can be easily effected in the obtained polymer electrolyte composition and this is preferred.

In a most preferred embodiment of the method for easily obtaining the polymer electrolyte composition of the present invention in industry, the extruder for melt-kneading the above-described components is a twin-or more multi-screw extruder allowing for incorporation of kneading blocks into arbitrary positions of a screw, all kneading block portions of the screw used are incorporated substantially at (L/D)≧1.5, more preferably (L/D)≧5 (wherein L indicates the total length of the kneading blocks and D indicates the maximum outer diameter of the kneading blocks), and (π·D·N/h)≧50 is satisfied [where π=3.14, D: outer diameter of screw corresponding to metering zone, N: screw rotation number (revolutions/sec), and h: depth of the channel of the metering zone]. The extruder has a first raw material supply port on the upstream side with respect to the flow direction of the raw material, and a second raw material supply port downstream the first raw material supply port, and if desired, one or more raw material supply port may be further provided downstream the second raw material supply port. Furthermore, if desired, a vacuum vent port may be provided between these raw material supply ports.

In addition, a method of mixing a solution of the polymer compound having an ion exchange group (A) or a precursor polymer thereof with respective solutions of the components (B) to (H) to prepare a solution and then removing the solvent may be used. Also in this case, when a precursor polymer solution is used in place of a solution of the polymer compound having an ion exchange group (A), the polymer electrolyte composition of the present invention can be obtained by performing an alkali hydrolysis treatment and an acid treatment after kneading to convert the composition into a form having an ion exchange group.

The polymer electrolyte composition of the present invention can be obtained by such a method, but in the present invention, when the composition has at least a structure that other components are finely dispersed in the polymer compound having an ion exchange group (A), the effect of the present invention, such as prolongation of life, can be obtained. More specifically, the composition suitably has a structure such that the particles comprising other components are dispersed in the polymer compound having an ion exchange group (A), to have an equivalent-circle average particle diameter of 0.0001 to 1 µm, preferably from 0.0001 to 0.8 µm, more preferably from 0.0001 to 0.5 µm, still more preferably from 0.0001 to 0.3 µm. This particle diameter range need not be satisfied in all regions of the composition and it is sufficient if from 50 to 100% of the entire region of the composition satisfies the above-described range.

The composition may also have a structure that the component (A) is intruding inside of dispersed particles comprising other components. However, in this case also, it is preferred in view of prolongation of life that the particle diameter of dispersed particles is, in terms of the equivalent-circle average particle diameter, from 0.0001 to 1 µm, preferably from 0.0001 to 0.8 µm, more preferably from 0.0001 to 0.5 µm, still more preferably from 0.0001 to 0.3 µm.

The proton exchange membrane which is described later also preferably has at least the above-described fine dispersion structure.

Such a fine dispersion structure can be controlled, for example, by the composition of the material or various conditions at the processing. More specifically, as for the composition of the material, the fine dispersion structure can be controlled by the combination or quantitative ratio of respective components, the use of a compatibilizing agent, the kind of solvent when a solvent is used, and the like. Also, various conditions at the processing include the temperature condition and the stirring and kneading condition. In particular, at the extrusion processing, the design and rotation number of screw have a large effect.

The equivalent-circle average particle diameter as used in the present invention is defined as follows. A slice is produced from the polymer electrolyte composition or proton exchange membrane of the present invention, dyed with a dying agent such as ruthenium tetroxide in a usual manner and observed by a transmission-type electron microscope, the average particle diameter in the dyed phase is determined, and this value is defined as the particle diameter. At this time, an arbitrary visual field of 20×20 µm of the slice is printed to a photograph directly or from a negative and read into an image analyzer, and the number average of equivalent-circle diameters (diameter of a circle having the same area) calculated of individual particles is defined as the average particle diameter. However, when the dyed boundary is indistinct at the time of inputting the data into the image analyzer from the photograph, the photograph is traced and by using the figure traced, the data are input into the image analyzer.

The method for manufacturing a proton exchange membrane comprising the polymer electrolyte composition of the present invention is described below. The polymer electrolyte composition of the present invention can be film-formed and used as a proton exchange membrane. The film-forming means is not particularly limited and a general film-forming method for polymer compositions can be suitably applied. Examples thereof include known film-forming methods such as calender molding, press molding, T-die molding and inflation molding. Among these, T-die molding and inflation molding are preferred as the method for easily obtaining a proton exchange membrane from the polymer electrolyte composition of the present invention in industry. In particular, inflation molding is preferred also in view of obtaining a film with small anisotropy.

Alternatively, after a precursor of the polymer electrolyte composition of the present invention, for example, a polymer composition comprising a precursor polymer of the polymer compound having an ion exchange group (A) and the components selected from the components (B) to (H), is film-formed by the above-described film-forming method, the film may be converted into a form having an ion exchange group by performing an appropriate after-treatment such as alkali hydrolysis treatment and acid treatment to obtain a proton exchange membrane comprising the polymer electrolyte composition of the present invention.

Furthermore, a proton exchange membrane can also be obtained by mixing respective solutions of the components (A) to (H) to prepare a solution, casting the solution and then removing the solvent. As for the casting method, a method of pouring the solution in a Petri dish and producing a film, and known coating methods such as gravure roll coater, natural roll coater, reverse roll coater, knife coater and dip coater can be used. Examples of the substrate which can be used for the casting method include substrates such as general polymer film, metal foil, alumina and silicon, a porous film obtained by stretching a PTFE film described in Japanese Unexamined Patent Publication (Kokai) No. 8-162132, and a fibrillated fiber described in Kokai No. 53-149881 and Japanese Examined Patent Publication (Kokoku) No. 63-61337. For the removal of the solvent, a method such as heat treatment at a temperature from room temperature to 200° C. or treatment under reduced pressure may be used. In the case of performing a heat treatment, it is also possible to stepwise elevate the temperature and thereby remove the solvent.

In addition, a proton exchange membrane comprising the polymer electrolyte composition of the present invention can also be obtained by using a solution of a precursor polymer in place of a solution of the polymer compound having an ion exchange group (A), mixing the solution with respective solutions of the components (B) to (H) to prepare a solution, casting this solution, removing the solvent, and performing an appropriate after-treatment such as alkali hydrolysis treatment and acid treatment to convert the film into a form having an ion exchange group.

In the production of the proton exchange membrane of the present invention, when transverse uniaxial stretching, simultaneous biaxial stretching or successive biaxial stretching is performed in combination with the above-described production method, stretching orientation can be imparted. Such a stretching treatment is preferred because the mechanical properties of the proton exchange membrane of the present invention can be enhanced. This stretching treatment may be performed in the state of a proton exchange membrane or in the state in which the proton exchange group is replaced with a metal salt such as sodium salt, potassium salt and calcium salt, an ammonium salt or the like. Also, in the case of film-forming a polymer composition comprising a precursor polymer of the polymer compound having an ion exchange group (A) and the components selected from the components (B) to (H), the stretching treatment may be performed in the state immediately after the film formation or may be performed after converting the film into a form having an ion exchange group by performing an appropriate after-treatment such as alkali hydrolysis treatment and acid treatment.

The stretching treatment is preferably performed at a draw ratio of 1.1 to 6.0 times in the transverse direction (TD) and at a draw ratio of 1.0 to 6.0 times in the machine direction (MD), more preferably at a draw ratio of 1.1 to 3.0 times in the transverse direction and at a ratio of 1.0 to 3.0 times in the machine direction, still more preferably at a draw ratio of 1.1 to 2.0 times in the transverse direction and at a draw ratio of 1.0 to 2.0 times in the machine direction. The area draw ratio is preferably from 1.1 to 36 times.

The proton exchange membrane of the present invention may have a structure where at least two proton exchange membranes differing in the compositional ratio are stacked. In the proton exchange membrane comprising the polymer electrolyte composition of the present invention, as the content of the resin except for the polymer compound having an ion exchange group (A) is higher, the membrane is more excellent in mechanical strength and the dry and wet dimensional stability, and as the content of the polymer compound having an ion exchange group (A) is higher, the membrane is more excellent in electrical properties such as proton conductivity. When two or more proton exchange membranes differing in compositional ratio are designed by making use of these characteristic properties and these membranes in combination are stacked, a proton exchange membrane excellent in all of mechanical strength, dry and wet-dimensional stability and electrical property can be more easily realized than in the case of a single layer membrane.

The number of layers stacked is not limited, but as the number of layers becomes larger, the production cost is higher. Therefore, the number of layers stacked is preferably on the order of 2 to 10, more preferably from 2 to 7, still more preferably from 3 to 5. In each layer, the compositional ratio of the polymer compound having an ion exchange group (A), the polyphenylene sulfide resin (B), the polyphenylene ether resin (C), the polysulfone resin (D) and the epoxy group-containing compound (F) can be arbitrarily changed within the above-described range. Also, the thickness of each layer can be arbitrarily changed, taking account of the characteristic properties.

For example, in the case of a multilayer structure comprising three or more layers, when the content of the polymer compound having an ion exchange group (A) in the inner layer is made to be smaller than that of at least one surface layer so as to prevent the dry and wet dimensional change of the inner layer, the thickness of the inner layer is preferably from 5 to 90%, more preferably from 7 to 80%, still more preferably from 10 to 50%, of the entire thickness. Also, when the content of the polymer compound having an ion exchange group (A) in the surface layers is made smaller than that of the inner layer so as to prevent the dry and wet dimensional change of the surface layers, the total thickness of the surface layers is preferably from 5 to 50%, more preferably from 7 to 45%, still more preferably from 10 to 40%, of the entire thickness.

In the production of the proton exchange membrane of the present invention, reinforcement, for example, by the addition of a reinforcing material comprising an inorganic or organic material or an organic-inorganic hybrid material or by the crosslinking may be applied in combination with the above-described production method. The reinforcing material may be a staple fiber substance, a particulate substance, a flaked substance or a continuous support such as porous film, mesh and non-woven fabric. By virtue of the reinforcement by the addition of a reinforcing material, the proton exchange membrane of the present invention can be easily enhanced in the mechanical strength and the dry and wet dimensional stability. In particular, when a staple fiber substance or a continuous support is used as the reinforcing material, a high reinforcement effect is obtained.

The reinforcing material may be added and mixed simultaneously with the melt-kneading or may be laminated on a film after the film formation.

The inorganic material used as the reinforcing material is not particularly limited as long as it has a reinforcement effect, and examples thereof include glass fiber, carbon fiber, cellulose fiber, kaolin clay, kaolinite, halloysite, pyrophyllite, talc, montmorillonite, sericite, mica, amesite, bentonite, asbestos, zeolite, calcium carbonate, calcium silicate, diatomaceous earth, silica sand, ferrous ferrite, aluminum hydroxide, aluminum oxide, magnesium oxide, titanium oxide, zirconium oxide, graphite, fullerene, carbon nanotube and carbon nanohorn. The organic material as the reinforcing material is also not particularly limited, as long as it has a reinforcement effect, and examples thereof include polyphenylene sulfide, polyphenylene ether, polysulfone, polyethersulfone, polyether ether sulfone, polyether ketone, polyether ether ketone, polythioethersulfone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide, polyetherimide, polyesterimide, polyamidoimide, polyamide, aromatic polyamide, polystyrene, acrylonitrile-styrene resin, polystyrene-hydrogenated polybutadiene-polystyrene block copolymer, acrylonitrile-butadiene-styrene resin, polyester, polyarylate, liquid crystal polyester, polycarbonate, polytetrafluoroethylene, polyvinylidene fluoride, polyvinyl chloride, polyvinylidene chloride, methacrylic resin, epoxy resin, phenol resin, melamine resin, urethane resin, cellulose, polyketone, polyacetal, polypropylene and polyethylene. An organic-inorganic hybrid material can also be used as the reinforcing material and examples thereof include organic silicon polymer compounds having a silsesquioxane structure or a siloxane structure, such as POSS (polyhedral oligomeric silsesquioxanes) and silicone rubber.

Also, by heat-treating the polymer electrolyte composition of the present invention, for example, at 160° C. or more in air or in an oxygen atmosphere, the mechanical property can be enhanced.

The equivalent weight EW of the proton exchange membrane (the gram number of dry mass of the proton exchange membrane per equivalent of the proton exchange group) produced in the present invention is preferably from 250 to 2,000, more preferably from 400 to 1,500, and most preferably from 500 to 1,200. By using a lower EW, that is, using a proton conductive polymer having a large proton exchange capacity, excellent proton conductivity is exhibited even under high-temperature low-humidification conditions and when used for a fuel cell, high output can be obtained at the operation.

The thickness of the proton exchange membrane produced in the present invention is preferably from 1 to 500 µm, more preferably from 2 to 100 µm, and most preferably from 5 to 50 µm.

The dry and wet dimensional change of the proton exchange membrane produced in the present invention is preferably from 0 to 100%, more preferably from 0 to 50%, and most preferably from 0 to 10%. The dry and wet dimensional change as used herein means a ratio of change in the dimension after standing for 1 hour in water at 80° C. based on the dimension after standing for 1 hour at 25° C.-20 RH %. The dimension means a length in the machine or transverse direction of the proton exchange membrane and both lengths preferably satisfy the above-described range.

A fuel cell is fabricated as follows by using the proton exchange membrane of the present invention, and the durability is evaluated.

(Membrane Electrode Assembly)

In the case of use for a solid polymer electrolyte fuel cell, the proton exchange membrane obtained in the present invention is used as a membrane electrode assembly (hereinafter simply referred to as "MEA") where two electrode catalyst layers of anode and cathode are joined on both surfaces of the membrane. In some cases, an assembly where a pair of gas diffusion layers are joined to oppose each other on the further outer side of the electrode catalyst layer is called MEA.

The electrode catalyst layer comprises a fine particulate catalyst metal and an electrically conducting agent having supported thereon the catalyst metal, and if desired, contains a water repellent. The catalyst used for the electrode may be sufficient if it is a metal of accelerating an oxidation reaction of hydrogen and a reduction reaction by oxygen, and examples thereof include platinum, gold, silver, palladium, iridium, rhodium, ruthenium, iron, cobalt, nickel, chromium, tungsten, manganese, vanadium and alloys thereof. Among these, platinum is predominantly used.

As for the production method of MEA, for example, the following method is used. An ion exchange resin is dissolved in a mixed solution of alcohol and water, and a platinum-supported carbon working out to an electrode substance is dispersed therein to produce a paste state. This paste in a predetermined amount is coated on a PTFE sheet and dried. Then, coated surfaces of PTFE sheets are opposed to each other and after interposing the proton exchange membrane of the present invention therebetween, these are transferred and joined by hot pressing at 100 to 200° C., whereby MEA can be obtained.

(Fuel Cell)

The MEA obtained above or a structure that a pair of gas diffusion electrodes are facing each other with the MEA between is further combined with a component used for general solid polymer electrolyte fuel cells, such as bipolar plate and backing plate, thereby fabricating a solid polymer electrolyte fuel cell.

The bipolar plate is, for example, a plate made of a graphite-resin composite material or a metal, in which channels for passing a gas such as fuel or oxidizing agent are formed on the surface, and this plate has not only a function of transmitting electrons to an exterior load circuit but also a function as a flow path for supplying a fuel or an oxidizing agent to the vicinity of the electrode catalyst. MEA is inserted between bipolar plates and a plurality of such combinations are stacked, whereby a fuel cell is produced.

The present invention is described in greater detail below by referring to Examples, but the present invention should not be construed as being limited to these Examples.

The evaluation methods and measurement methods used in the present invention are as follows.

(Measurement of Proton Conductivity)

A membrane sample in a wet state is cut out and the thickness T is measured. The sample is loaded on a two-terminal conductivity measuring cell for measuring the conductivity in the length direction of a film having a width of 1 cm and a length of 5 cm. This cell is placed in ion exchanged water at 80° C., the resistance value R of real number component at a frequency of 10 kHz is measured by an AC impedance method, and the proton conductivity σ is determined according to the following formula:

$$\sigma = L/(R \times T \times W)$$

σ: proton conductivity (S/cm),
T: thickness (cm),
R: resistance (Ω),
L (=5): film length (cm), and
W (=1): film width (cm).

(Evaluation of Fuel Cell)

(1) Production of Fuel Cell

A proton exchange membrane is interposed between two gas diffusion electrodes each coated on a mount and hot-pressed at 180° C. under a pressure of 10 MPa to transfer and join the gas diffusion electrodes to the proton exchange membrane, whereby MEA is produced.

The gas diffusion electrode used here is prepared as follows. A solution obtained by concentrating a perfluorosulfonic acid polymer solution SS-700x/05 (produced by Asahi Kasei Corporation, EW: 720, solvent composition: ethanol/water=50/50 (by mass)) to 12 wt % and ethanol are added to a platinum-supported catalyst TEC10 E40E (loading percentage of platinum: 40 wt %) produced by Tanaka Kikinzoku Kogyo K.K., these are mixed and stirred to produce an ink state, and the ink is coated on a PTFE sheet and dried and solidified at 150° C. in an air atmosphere. In this gas diffusion electrode, the amount of platinum supported is 0.4 mg/cm$^2$ and the amount of polymer supported is 0.5 mg/cm$^2$.

A water repellent-treated carbon paper or carbon cloth is disposed on both sides of MEA prepared above and the MEA is integrated into an evaluation cell and set in an evaluation apparatus. Using hydrogen gas as the fuel and air gas as the oxidizing agent, a single cell characteristic test is performed at a cell temperature of 100° C. under 0.1 MPa. For the gas humidification, a water bubbling system is employed and both the hydrogen gas and the air gas are supplied to the cell after being humidified at 50° C.

(2) Measurement of Fluoride Release Rate

Waste waters discharged together with the anode exhaust gas and cathode exhaust gas during the single cell characteristic test each is trapped and recovered for a predetermined time and then weighed. After fixing a fluoride electrode 9609BNionplus manufactured by Meditrial K.K. to a benchtop pH ion meter 920Aplus manufactured by the same company, the fluoride ion concentrations in the anode waste water and in the cathode waste water are measured and the fluoride release rate G is determined according to the following formula:

$$G=(Wa \times Fa+Wc \times Fc)/(T \times A)$$

G: fluoride release rate ($\mu g/Hr/cm^2$),
Wa: weight (g) of anode waste water trapped and recovered,
Fa: fluoride ion concentration (ppm) in anode waste water,
Wc: weight of cathode waste water trapped and recovered,
Fc: fluoride ion concentration (ppm) in cathode waste water,
T: time period (Hr) used for trapping and recovery of waste water, and
A: electrode area ($cm^2$) of MEA.

(3) Measurement of Cross-Leakage Amount

The cathode exhaust gas discharged during the single cell characteristic test is partially introduced into a micro-gas chromatograph Micro GC CP-4900 manufactured by GL Science, the hydrogen gas concentration in the cathode exhaust gas is measured, and the hydrogen gas permeability is determined according to the following formula:

$$L=(X \times V \times T) \times (5-U/100)/(3 \times A \times P) \times 10^{-8}$$

L: hydrogen gas permeability ($ml \times cm/cm^2/sec/Pa$),
X: hydrogen gas concentration (ppm) in cathode exhaust gas,
V: cathode gas flow rate (ml/min),
T: thickness of proton exchange membrane (cm),
U: cathode gas utilization ratio (%),
A: hydrogen permeation area ($cm^2$) of proton exchange membrane, and
P: hydrogen partial pressure difference (Pa) between cathode and anode.

The point of time when the hydrogen gas permeability during the single cell characteristic test becomes $1.1 \times 10^{-11}$ ($ml \times cm/cm^2/sec/Pa$) or more is regarded as the cell life, and the test is terminated at this point of time.

EXAMPLE 1

Using a biaxial extruder (ZSK-40, manufactured by WERNER & PFLEIDERER, Germany) set at a temperature of 280 to 310° C. and a screw rotation number of 200 rpm, 99 parts by weight of a precursor polymer (MI: 3.0, Ew after alkali hydrolysis and acid treatment: 730) obtained from tetrafluoroethylene and $CF_2$=$CFO(CF_2)_2$—$SO_2F$, 0.5 parts by weight of polyphenylene sulfide (produced by Sigma-Aldrich Japan K.K., melt viscosity at 310° C.: 275 poise), and 0.5 parts by weight of polyphenylene ether (obtained by oxidative polymerization of 2,6-xylenol, reduced viscosity: 0.51, glass transition temperature (Tg): 209° C.) were supplied from a first raw material supply port of the extruder and melt-kneaded. Thereafter, the kneaded material was melt-extruded by using a T-die extruder to form a 50 μm-thick film. This film was contacted with an aqueous solution having dissolved therein potassium hydroxide (15 mass %) and dimethylsulfoxide (30 mass %) at 60° C. for 4 hours, thereby effecting an alkali hydrolysis treatment, subsequently dipped in water at 60° C. for 4 hours and then in an aqueous 2N hydrochloric acid solution at 60° C. for 3 hours, washed with ion exchanged water and dried to obtain a proton exchange membrane (Ew: 736).

The proton conductivity of the obtained proton exchange membrane was as high as 0.23 (S/cm). This proton exchange membrane was subjected to the evaluation of fuel cell, as a result, the average fluoride release rate in the waste water from the initiation until passage of 200 hours showed a very low value of 0.038 ($\mu g/Hr/cm^2$) The cell life reached 750 hours, revealing that the proton exchange membrane exhibits excellent durability.

EXAMPLE 2

A proton exchange membrane (Ew: 737) was obtained in the same manner as in Example 1 except for using polysulfone (produced by Sigma-Aldrich Japan K.K., number average molecular weight: 26,000) in place of polyphenylene ether.

The proton conductivity of the obtained proton exchange membrane was as high as 0.23 (S/cm). This proton exchange membrane was subjected to the evaluation of fuel cell, as a result, the average fluoride release rate in the waste water from the initiation until passage of 200 hours showed a very low value of 0.049 ($\mu g/Hr/cm^2$). The cell life reached 660 hours, revealing that the proton exchange membrane exhibits excellent durability.

COMPARATIVE EXAMPLE 1

A proton exchange membrane (EW: 730, MI: 3.0) was obtained in the same manner as in Example 1, except that the precursor polymer (MI: 3.0, Ew after alkali hydrolysis and acid treatment: 730) obtained from tetrafluoroethylene and $CF_2$=$CFO(CF_2)_2$—$SO_2F$ was used alone.

The proton conductivity of the obtained proton exchange membrane was as high as 0.23 (S/cm). This proton exchange membrane was subjected to the evaluation of a fuel cell, and as a result, the average fluoride release rate in the waste water from the initiation until the cell life showed a very high value of 0.506 ($\mu g/Hr/cm^2$) and moreover, the cell life was less than 200 hours, failing to obtain a sufficiently high durability.

COMPARATIVE EXAMPLES 2 to 35

Using a biaxial extruder (ZSK-40, manufactured by WERNER & PFLEIDERER, Germany) set at a temperature of 280 to 310° C. and a screw rotation number of 200 rpm, 99 parts by weight of a precursor polymer (MI: 3.0, Ew after alkali hydrolysis and acid treatment: 730) obtained from tetrafluoroethylene and $CF_2$=$CFO(CF_2)_2$-$SO_2F$, 0.5 parts by weight of Resin X, and 0.5 parts by weight of Resin Y were supplied from a first raw material supply port of the extruder and melt-kneaded. Thereafter, the kneaded material was melt-extruded by using a T-die extruder to form a 50 μm-thick film. As for Resin X and Resin Y, the following resins were used in various combinations. The correspondence between the combination and Example or Comparative Example No. is shown in Table 1.

Polyphenylene sulfide (in Table, denoted as PPS): produced by Sigma-Aldrich Japan K.K., melt viscosity at 310° C.: 275 poise
  Polyphenylene ether (in Table, PPE): obtained by oxidative polymerization of 2,6-xylenol, reduced viscosity: 0.51, glass transition temperature (Tg): 209° C.
  Polysulfone (in Table, PSF): produced by Sigma-Aldrich Japan K.K., number average molecular weight: 26,000
  Polystyrene (in Table, PS): produced by Sigma-Aldrich Japan K.K., weight average molecular weight: 230,000
  Epoxy resin (in Table, Epoxy): produced by Dai-Nippon Ink & Chemicals, Inc., cresol novolak-type epoxy resin N-660
  Polyethersulfone (in Table, PES), produced by AKROS Limited
  Polyether ether sulfone (in Table, PEES): produced by Sigma-Aldrich Japan K.K.
  Polytetrafluoroethylene (in Table, PTFE): produced by Daikin Kogyo Co., Ltd., FA-500

TABLE 1

| X/Y | PPS | PPE | PSF | PS | Epoxy | PES | PEES | PTFE |
|---|---|---|---|---|---|---|---|---|
| PPS | Comparative Example 2 | Example 1 | Example 2 | Comparative Example 3 | Comparative Example 4 | Comparative Example 5 | Comparative Example 6 | Comparative Example 7 |
| PPE | — | Comparative Example 8 | Comparative Example 9 | Comparative Example 10 | Comparative Example 11 | Comparative Example 12 | Comparative Example 13 | Comparative Example 14 |
| PSF | — | — | Comparative Example 15 | Comparative Example 16 | Comparative Example 17 | Comparative Example 18 | Comparative Example 19 | Comparative Example 20 |
| PS | — | — | — | Comparative Example 21 | Comparative Example 22 | Comparative Example 23 | Comparative Example 24 | Comparative Example 25 |
| Epoxy | — | — | — | — | Comparative Example 26 | Comparative Example 27 | Comparative Example 28 | Comparative Example 29 |
| PES | — | — | — | — | — | Comparative Example 30 | Comparative Example 31 | Comparative Example 32 |
| PEES | — | — | — | — | — | — | Comparative Example 33 | Comparative Example 34 |
| PTFE | — | — | — | — | — | — | — | Comparative Example 35 |

These films were each contacted with an aqueous solution having dissolved therein potassium hydroxide (15 mass %) and dimethylsulfoxide (30 mass %) at 60° C. for 4 hours, thereby effecting an alkali hydrolysis treatment, subsequently dipped in water at 60° C. for 4 hours and then in an aqueous 2N hydrochloric acid solution at 60° C. for 3 hours, washed with ion exchanged water and dried to obtain a proton exchange membrane.

Various proton exchange membranes each using a combination of resins in Table 1 were subjected to the evaluation of fuel cell, and the average fluoride release rate in the waste water from the initiation until passage of 200 hours (provided that when the cell life was less than 200 hours, from the initiation until the cell life) was determined. The results are shown in Table 2. It is seen from comparison with Examples 1 and 2 that in all fuel cells, the average fluorine dissolving-out rate was at least 2 times larger and good durability was not obtained.

TABLE 2

| X/Y | PPS | PPE | PSF | PS | Epoxy | PES | PEES | PTFE |
|---|---|---|---|---|---|---|---|---|
| PPS | 0.100 | 0.038 | 0.049 | 0.213 | 0.222 | 0.189 | 0.155 | 0.172 |
| PPE | — | 0.784 | 0.362 | 0.953 | 0.845 | 0.665 | 0.536 | 0.683 |
| PSF | — | — | 0.152 | 0.736 | 0.557 | 0.273 | 0.202 | 0.279 |
| PS | — | — | — | 1.061 | 1.022 | 0.802 | 0.654 | 0.897 |
| Epoxy | — | — | — | — | 0.973 | 0.679 | 0.514 | 0.748 |
| PES | — | — | — | — | — | 0.450 | 0.428 | 0.430 |
| PEES | — | — | — | — | — | — | 0.382 | 0.401 |
| PTFE | — | — | — | — | — | — | — | 0.425 | unit: μg/Hr/cm²

EXAMPLES 3 to 12

Proton exchange membranes were obtained in the same manner as in Examples 1 and 2, except for changing the compositional ratio or the like of Examples 1 and 2, and subjected to the evaluation of fuel cell. The results are shown in Table 3. In all fuel cells, not only the average fluoride release rate in waste water from the initiation until passage of 200 hours, but also the fluoride release rate after about 500 hours were very low. Moreover, the cell life exceeded 1,000 hours in all samples and it was revealed that very excellent durability is exhibited.

The change in each Example from Examples 1 and 2 is described below.

EXAMPLE 3

The compositional ratio of Example 1 was changed to 95 parts by weight of the precursor polymer obtained from tetrafluoroethylene and $CF_2=CFO(CF_2)_2-SO_2F$, 3 parts by weight of polyphenylene sulfide and 2 parts by weight of polyphenylene ether.

EXAMPLE 4

The compositional ratio of Example 1 was changed to 95 parts by weight of the precursor polymer obtained from tetrafluoroethylene and $CF_2=CFO(CF_2)_2-SO_2F$, 1 part by weight of polyphenylene sulfide and 3 parts by weight of polyphenylene ether.

EXAMPLE 5

Polyphenylene sulfide (melt viscosity (a value measured by using a flow tester after keeping at 300° C. under a load of 20 Kgf/cm² with L/D (L: orifice length, D: orifice inner diameter)=10/1 for 6 minutes): 50 Pa·s, amount extracted with methylene chloride: 0.7 wt %, amount of –SX group: 25 μmol/g) was used, and the compositional ratio of Example 1 was changed to 90 parts by weight of the precursor polymer obtained from tetrafluoroethylene and $CF_2=CFO(CF_2)_2-SO_2F$, 6 parts by weight of polyphenylene sulfide and 2.5 parts by weight of polyphenylene ether.

EXAMPLE 6

Polyphenylene sulfide (melt viscosity (a value measured by using a flow tester after keeping at 300° C. under a load of 20 Kgf/cm² with L/D (L: orifice length, D: orifice inner diameter)=10/1 for 6 minutes): 50 Pa·s, amount extracted with methylene chloride: 0.7 wt %, amount of –SX group: 25 μmol/g) was used, and the compositional ratio of Example 2 was changed to 80 parts by weight of the precursor polymer obtained from tetrafluoroethylene and $CF_2=CFO(CF_2)_2-SO_2F$, 15 parts by weight of polyphenylene sulfide and 5 parts by weight of polysulfone.

EXAMPLE 7

Polyphenylene ether (obtained by oxidative polymerization of 2,6-xylenol and 3,3',5,5'-tetramethyl bisphenol A, reduced viscosity: 0.105, glass transition temperature: 165° C.) was used, and the compositional ratio of Example 5 was changed to 70 parts by weight of the precursor polymer obtained from tetrafluoroethylene and $CF_2$=$CFO(CF_2)_2$—$SO_2F$, 25 parts by weight of polyphenylene sulfide and 5 parts by weight of polyphenylene ether.

EXAMPLE 8

To the components of Example 5, 0.3 parts by weight of a styrene-glycidyl methacrylate copolymer (weight average molecular weight: 110,000) containing 5 wt % of glycidyl methacrylate was further added.

EXAMPLE 9

To the components of Example 8, 1.5 parts by weight of a hydrogenated block copolymer having a polystyrene-hydrogenated polybutadiene-polystyrene structure, in which the amount of bonded styrene was 35 wt %, the number average molecular weight was 178,000, and the amount of 1,2-vinyl bond in the polybutadiene moiety before hydrogenation was 48%, was further added.

EXAMPLE 10

An epoxy resin (produced by Dai-Nippon Ink & Chemicals, Inc., cresol novolak-type epoxy resin N-660) was further added to the components of Example 5, and the compositional ratio was changed to 90 parts by weight of the precursor polymer obtained from tetrafluoroethylene and $CF_2$=$CFO(CF_2)_2$-$SO_2F$, 7 parts by weight of polyphenylene sulfide, 1 part by weight of polyphenylene ether and 2 parts by weight of epoxy resin.

EXAMPLE 11

In Example 5, an epoxy-modified polyphenylene ether (prepared by previously mixing and reacting a polyphenylene ether (obtained by oxidative polymerization of 2,6-xylenol and 3,3',5,5'-tetramethyl bisphenol A, reduced viscosity: 0.105, glass transition temperature: 165° C.) and an epoxy resin (produced by Dai-Nippon Ink & Chemicals, Inc., cresol novolak-type epoxy resin N-660)) was used in place of polyphenylene ether, and the compositional ratio was changed to 90 parts by weight of the precursor polymer obtained from tetrafluoroethylene and $CF_2$=$CFO(CF_2)_2$—$SO_2F$, 7 parts by weight of polyphenylene sulfide and 3 parts by weight of epoxy-modified polyphenylene ether.

EXAMPLE 12

A proton exchange membrane was obtained in the same manner as in Example 4, except for changing the screw rotation number of the twin screw extruder to 500 rpm.

The equivalent-circle average particle diameter of dispersed particles in this proton exchange membrane was 0.9 μm and small as compared with the equivalent-circle average particle diameter (2.0 μm) of the dispersed particles in the proton exchange membrane of Example 4 having the same composition. This proton exchange membrane was subjected to the evaluation of a fuel cell, and as a result, the fluorine dissolving-out rate was smaller than that of the proton exchange membrane of Example 4, revealing that this proton exchange membrane exhibits more excellent durability.

TABLE 3

| | Equivalent Weight, Ew | Proton Conductivity (S/cm) | Cross-Leakage Amount before Operation (ml·cm/cm²/sec/Pa) | Cell Life (Hr) | F⁻ Release Rate (μg/Hr/cm²) 200 Hr | F⁻ Release Rate (μg/Hr/cm²) 500 Hr |
|---|---|---|---|---|---|---|
| Example 1 | 736 | 0.23 | $5.6 \times 10^{-13}$ | 750 | 0.038 | 0.083 |
| Example 2 | 737 | 0.23 | $5.9 \times 10^{-13}$ | 660 | 0.049 | 0.115 |
| Example 3 | 767 | 0.24 | $5.9 \times 10^{-13}$ | >1000 | 0.016 | 0.025 |
| Example 4 | 768 | 0.24 | $6.3 \times 10^{-13}$ | >1000 | 0.034 | 0.056 |
| Example 5 | 795 | 0.23 | $5.8 \times 10^{-13}$ | >1000 | 0.017 | 0.020 |
| Example 6 | 903 | 0.21 | $5.4 \times 10^{-13}$ | >1000 | 0.021 | 0.022 |
| Example 7 | 1032 | 0.18 | $5.1 \times 10^{-13}$ | >1000 | 0.016 | 0.017 |
| Example 8 | 796 | 0.23 | $6.0 \times 10^{-13}$ | >1000 | 0.012 | 0.014 |
| Example 9 | 799 | 0.24 | $5.8 \times 10^{-13}$ | >1000 | 0.009 | 0.013 |
| Example 10 | 802 | 0.24 | $5.7 \times 10^{-13}$ | >1000 | 0.010 | 0.011 |
| Example 11 | 798 | 0.23 | $5.5 \times 10^{-13}$ | >1000 | 0.009 | 0.010 |
| Example 12 | 768 | 0.24 | $5.8 \times 10^{-13}$ | >1000 | 0.020 | 0.032 |
| Comparative Example 1 | 730 | 0.23 | $6.0 \times 10^{-13}$ | <200 | 0.506 | — |
| Comparative Example 2 | 739 | 0.23 | $6.5 \times 10^{-13}$ | 200 | 0.100 | — |
| Comparative Example 36 | 1153 | 0.18 | $3.3 \times 10^{-13}$ | 360 | 0.035 | — |
| Comparative Example 37 | 1225 | 0.17 | $2.5 \times 10^{-14}$ | 410 | 0.029 | — |
| Comparative Example 38 | 1010 | 0.18 | $1.1 \times 10^{-13}$ | 370 | 0.043 | — |
| Comparative Example 39 | 1189 | 0.15 | $4.0 \times 10^{-13}$ | 340 | 0.033 | — |
| Comparative Example 40 | 1110 | 0.20 | $7.2 \times 10^{-13}$ | 300 | 0.632 | — |

EXAMPLE 13

In Example 11, the kneaded material was melt-extruded by using an annular die in place of a T-die extruder and then inflation-molded to form a 50 μm-thick film. At this time, the diameter of the annular die was 50 mm, the slit opening was 500 μm, the resin temperature was 250° C., the longitudinal draw ratio was 3.3 times, and the transverse blow-up ratio was 3.0 times. This film was cut into a 7 cm square and freely shrunk in the plane direction at 230° C. for 10 minutes, as a result, almost the same shrinkage was observed in both the machine direction and the transverse direction. Although the film of Example 11 obtained by using a T-die extruder exhibited a behavior wherein large shrinkage occurred only in the machine direction and the transverse direction was rather swelled, the film obtained in this example was confirmed to exhibit a high-temperature dimensional change behavior greatly different from this behavior. Furthermore, in this film, the orientation balance was good, the longitudinal and transverse anisotropy was small, and the strength and reinforcement effect were changed for the better.

This film was subjected to alkali hydrolysis treatment, acid treatment, water washing and drying in the same manner as in Example 11 to obtain a 50 μm-thick proton exchange membrane (Ew: 798).

The difference in the dry and wet dimensional change between the machine direction and the transverse direction of this proton exchange membrane was less than 2% and it was confirmed that the anisotropy of the film was remarkably reduced as compared with the proton exchange membrane of Example 11, where the difference in the dry and wet dimensional change between the machine direction and the transverse direction was about 20%. The proton conductivity of this proton exchange membrane was as high as 0.25 (S/cm). When this proton exchange membrane was subjected to the evaluation of fuel cell, the average fluoride release rate in the waste water from the initiation until passage of 200 hours showed a very low value of 0.010 ($\mu$g/Hr/cm$^2$), similarly to the proton exchange membrane of Example 11, revealing that this proton exchange membrane exhibits excellent durability.

EXAMPLE 14

In Example 11, the kneaded material was melt-extruded by using a T-die extruder to form a 200 μm-thick film, and this film was stretched at 120° C. by a simultaneous biaxial stretching apparatus (manufactured by Toyo Seiki Seisaku-Sho, Ltd.) at a draw ratio of 2.0 times in the machine direction, at a draw ratio of 2.0 times in the transverse direction and at an area draw ratio of 4 times, and then subjected to alkali hydrolysis treatment, acid treatment, water washing and drying in the same manner as in Example 11 to obtain a 50 μm-thick proton exchange membrane (Ew: 798).

The piercing strength of this proton exchange membrane was measured by using a handy compression tester (manufactured by Kato Tech Co., Ltd.) (radius of probe: 0.5 mm, piercing rate: 2 mm/s, performed in air at 25° C.) and found to be about 2 times larger than that of the proton exchange membrane of Example 11. Thus, enhancement of the film strength was confirmed. The proton conductivity of this proton exchange membrane was as high as 0.26 (S/cm). When this proton exchange membrane was subjected to the evaluation of fuel cell, the average fluoride release rate in the waste water from the initiation until passage of 200 hours showed a very low value of 0.009 ($\mu$m/Hr/cm$^2$), similarly to the proton exchange membrane of Example 11, revealing that this proton exchange membrane exhibits excellent durability.

EXAMPLE 15

In Example 5, the kneaded material was melt-extruded by using a T-die extruder to form a 40 μm-thick film, and this film was designated as Film A. Separately, the compositional ratio of Example 5 was changed to 60 parts by weight of the precursor polymer obtained from tetrafluoroethylene and $CF_2=CFO(CF_2)_2-SO_2F$, 30 parts by weight of polyphenylene sulfide and 10 parts by weight of polyphenylene ether, and the kneaded material was melt-extruded by using a T-die extruder to form a 5 μm-thick film, which was designated as Film B.

Film A was interposed between two sheets of Film B and then press-bonded under heat at 290° C. and 10 MPa to form a film having a thickness of about 50 μm, and this film was subjected to alkali hydrolysis treatment, acid treatment, water washing and drying in the same manner as in Example 5 to obtain a proton exchange membrane (Ew: 861).

The dry and wet dimensional change of this proton exchange membrane was decreased to about 50% of that of the proton exchange membrane of Example 5, and it was confirmed that the dry and wet dimensional stability was enhanced. The proton conductivity of this proton exchange membrane was as high as 0.15 (S/cm). When this proton exchange membrane was subjected to the evaluation of fuel cell, the average fluoride release rate in the waste water from the initiation until passage of 200 hours showed a very low value of 0.009 ($\mu$g/Hr/cm$^2$), similarly to the proton exchange membrane of Example 5, revealing that this proton exchange membrane exhibited excellent durability.

EXAMPLE 16

In Example 11, the kneaded material was melt-extruded by using a T-die extruder to form a 25 μm-thick film, and this film was designated as Film A. Separately, the compositional ratio of Example 5 was changed to 50 parts by weight of the precursor polymer obtained from tetrafluoroethylene and $CF_2=CFO(CF_2)_2-SO_2F$, 35 parts by weight of polyphenylene sulfide and 15 parts by weight of polyphenylene ether, and the kneaded material was melt-extruded by using a T-die extruder to form a 5 μm-thick film, which was designated as Film B.

Film B was interposed between two sheets of Film A and then press-bonded under heat at 290° C. and 10 MPa to form a film having a thickness of about 55 μm, and this film was subjected to alkali hydrolysis treatment, acid treatment, water washing and drying in the same manner as in Example 11 to obtain a proton exchange membrane (Ew: 847).

The swelling percentage in the length direction of this proton exchange membrane in water at 25° C. was decreased to about 45% of that of the proton exchange membrane of Example 11, and it was confirmed that the dimensional stability under dry and wet conditions was enhanced. The proton conductivity of this proton exchange membrane was as high as 0.20 (S/cm). When this proton exchange membrane was subjected to the evaluation of fuel cell, the average fluoride release rate in the waste water from the initiation until passage of 200 hours showed a very low value of 0.009 ($\mu$g/Hr/cm$^2$), similarly to the proton exchange membrane of Example 11, revealing that this proton exchange membrane exhibited excellent durability.

EXAMPLE 17

In Example 5, the kneaded material was melt-extruded by using a T-die extruder to form a 25 μm-thick film, and this film was designated as Film A.

A 10 μm-thick polyphenylene sulfide film (produced by Toray Industries, Inc.) porosified to a porosity of 70% was interposed between two sheets of Film A and then press-bonded under heat at 290° C. and 10 MPa to form a film having a thickness of about 50 μm, and this film was subjected to alkali hydrolysis treatment, acid treatment, water washing and drying in the same manner as in Example 5 to obtain a proton exchange membrane (Ew: 853).

The dry and wet dimensional change of this proton exchange membrane was decreased to about 30% of that of the proton exchange membrane of Example 5, and it was confirmed that the dry and wet dimensional stability was enhanced. The proton conductivity of this proton exchange membrane was as high as 0.17 (S/cm). When this proton exchange membrane was subjected to the evaluation of fuel cell, the average fluoride release rate in the waste water from the initiation until passage of 200 hours showed a very low value of 0.009 (μ/Hr/cm$^2$), similarly to the proton exchange membrane of Example 5, revealing that this proton exchange membrane exhibited excellent durability.

EXAMPLE 18

In Example 5, the kneaded material was melt-extruded by using a T-die extruder to form a 20 μm-thick film, and this film was designated as Film A.

Separately, in Example 5, a polyphenylene sulfide containing 30% of glass fiber (produced by Dai-Nippon Ink & Chemicals, Inc.) was used in place of the polyphenylene sulfide, the compositional ratio was changed to 50 parts by weight of the precursor polymer obtained from tetrafluoroethylene and $CF_2$=$CFO(CF_2)_2$—$SO_2F$, 45 parts by weight of polyphenylene sulfide and 5 parts by weight of polyphenylene ether, and the kneaded material was melt-extruded by using a T-die extruder to form a 10 μm-thick film, which was designated as Film B.

Film B was interposed between two sheets of Film A and then press-bonded under heat at 290° C. and 10 MPa to form a film having a thickness of about 50 μm, and this film was subjected to alkali hydrolysis treatment, acid treatment, water washing and drying in the same manner as in Example 5 to obtain a proton exchange membrane (Ew: 921).

The dry and wet dimensional change of this proton exchange membrane was decreased to about 30% of that of the proton exchange membrane of Example 5, and it was confirmed that the dry and wet dimensional stability was enhanced. The proton conductivity of this proton exchange membrane was as high as 0.17 (S/cm). When this proton exchange membrane was subjected to the evaluation of fuel cell, the average fluoride release rate in the waste water from the initiation until passage of 200 hours showed a very low value of 0.009 (μg/Hr/cm$^2$), similarly to the proton exchange membrane of Example 5, revealing that this proton exchange membrane exhibited excellent durability.

COMPARATIVE EXAMPLES 36 to 40

Proton exchange membranes obtained by impregnating various porous substrates with a perfluorocarbon sulfonic acid polymer were subjected to the evaluation of fuel cell. The results are shown together in Table 3. In some samples, the fluoride release rate was decreased because of decrease in the ratio of perfluorocarbon sulfonic acid polymer contained, but the cell life was about 400 hours at longest and it was found that good durability was not obtained in all samples.

The preparation method of the proton exchange membrane in each Comparative Example is briefly described below.

COMPARATIVE EXAMPLE 36

A precursor polymer (MI: 3.0, Ew after alkali hydrolysis and acid treatment: 730) obtained from tetrafluoroethylene and $CF_2$=$CFO(CF_2)_2$-$SO_2F$ was contacted with an aqueous solution having dissolved therein potassium hydroxide (15 mass %) and dimethylsulfoxide (30 mass %) at 60° C. for 4 hours, thereby effecting an alkali hydrolysis treatment, and after dipped in water at 60° C. for 4 hours, then dipped in an aqueous 2N hydrochloric acid solution at 60° C. for 3 hours, washed with ion exchanged water and dried to obtain a perfluorocarbon sulfonic acid polymer (Ew: 730). The obtained perfluorocarbon sulfonic acid polymer was placed in an autoclave together with an aqueous ethanol solution (water:ethanol=50.0:50.0 (by weight)), and the autoclave was hermetically closed and after elevating the temperature to 180° C., kept for 5 hours. Thereafter, the autoclave was naturally cooled and Polymer Solution C having a composition of perfluorocarbon sulfonic acid polymer:water:ethanol=5.0:47.5:47.5 (by weight) was obtained.

A porosified polyphenylene sulfide film (obtained by porosifying a 50 μm-thick polyphenylene sulfide film (produced by Toray Industries, Inc.) to a porosity of 60%) was thoroughly impregnated with Polymer Solution C, then placed in an oven, dried at 80° C. for 1 hour and after elevating the temperature to 160° C., heat-treated for another 1 hour to obtain a proton exchange membrane (Ew: 1,153).

COMPARATIVE EXAMPLE 37

A proton exchange membrane (Ew: 1,225) was obtained in the same manner as in Comparative Example 36, except for using a polyimide porous substrate (produced by Ube Industries, Ltd.) in place of the porosified polyphenylene sulfide film.

COMPARATIVE EXAMPLE 38

Polysulfone (produced by Sigma-Aldrich Japan K.K., number average molecular weight: 26,000) was added to dimethylformamide and stirred at 80° C. for 24 hours to obtain a polysulfone solution. This solution was cast on a glass plate by using a bar coater to a thickness of about 50 μm and then immediately dipped in water as a poor solvent for 30 minutes to precipitate the polysulfone, thereby effecting the porosification. The obtained porous body was fixed at four sides, placed in an oven and dried at 120° C. for 24 hours to obtain a porosified polysulfone film.

A proton exchange membrane (Ew: 1,010) was obtained in the same manner as in Comparative Example 36, except for using the porosified polysulfone film prepared above in place of the porosified polyphenylene sulfide film.

COMPARATIVE EXAMPLE 39

A porosified polyether sulfone film was obtained in the same manner as in Comparative Example 38, except for using a polyethersulfone (produced by Akros Limited) in place of the polysulfone. A proton exchange membrane (Ew: 1,189) was obtained in the same manner as in Comparative Example 36, except for using the film prepared above in place of the porosified polyphenylene sulfide film.

COMPARATIVE EXAMPLE 40

A proton exchange membrane (Ew: 1,110) was obtained in the same manner as in Comparative Example 36 except for using a polytetraethylene porous substrate (WP500-100, produced by Sumitomo Electric Industries, Ltd.) in place of the porosified polyphenylene sulfide film.

As described in detail in the foregoing pages, the proton exchange membrane obtained from the polymer electrolyte composition of the present invention is a proton exchange membrane ensuring high durability even under high temperature and is suitably used in the fields of ion exchange membrane and fuel cell. The proton exchange membrane obtained according to the present invention is usable for various fuel cells including direct methanol-type fuel cell as well as for water electrolysis, hydrogen halide acid electrolysis, sodium chloride electrolysis, oxygen concentrator, moisture sensor, gas sensor and the like.

The invention claimed is:

1. A polymer electrolyte composition comprising (A) a polymer compound having an ion exchange group, (B) a polyphenylene sulfide resin, and (C) a polyphenylene ether resin, wherein the polymer compound having an ion exchange group (A) has a structural unit represented by the following formula (1):

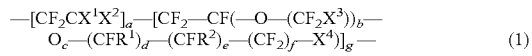

$$-[CF_2CX^1X^2]_a-[CF_2-CF(-O-(CF_2X^3))_b-O_c-(CFR^1)_d-(CFR^2)_e-(CF_2)_f-X^4)]_g- \quad (1)$$

wherein $X^1$, $X^2$ and $X^3$ each is independently a halogen atom or a perfluoroalkyl group having from 1 to 3 carbon atoms, a and g are $0 \leq a < 1$, $0 < g \leq 1$ and $a+g=1$, b is an integer of 0 to 8, c is 0 or 1, d, e and f each is independently an integer of 0 to 6 (with the proviso that d+e+f is not 0), $R^1$ and $R^2$ each is independently a halogen element or a perfluoroalkyl or fluorochloroalkyl group having from 1 to 10 carbon atoms, and $X^4$ is COOZ, $SO_3Z$, $PO_3Z_2$ or $PO_3HZ$, wherein Z is a hydrogen atom, an alkali metal atom, an alkaline earth metal atom, $NH_4$, $NH_3R_1$, $NH_2R_1R_2$, $NHR_1R_2R_3$, or $NR_1R_2R_3R_4$, wherein $R_1$, $R_2$, $R_3$ and $R_4$ each is an alkyl group or an arene group.

2. A polymer electrolyte composition according to claim 1, wherein the polyphenylene ether resin (C) is an epoxy-modified polyphenylene ether (E).

3. A polymer electrolyte composition according to claim 1, which comprises (A) a polymer compound having an ion exchange group, (B) a polyphenylene sulfide resin, (C) a polyphenylene ether resin and (F) an epoxy group-containing compound.

4. A polymer electrolyte composition according to claim 3, wherein the epoxy group-containing compound (F) is a homopolymer or copolymer of an unsaturated monomer having an epoxy group (G).

5. A polymer electrolyte composition according to claim 4, wherein the epoxy group-containing compound (F) is a copolymer comprising an unsaturated monomer having an epoxy group and a styrene monomer (G).

6. A polymer electrolyte composition according to claim 3, wherein the epoxy group-containing compound (F) is an epoxy resin (H).

7. A polymer electrolyte composition according to claim 6, which comprises (E) an epoxy-modified polyphenylene ether resulting from a reaction at least partially proceeding between the polyphenylene ether resin (C) and the epoxy resin (H) in the polymer electrolyte composition.

8. A polymer electrolyte composition according to claim 1, wherein the polymer compound having an ion exchange group (A) is a perfluorocarbon polymer compound having an ion exchange group.

9. A polymer electrolyte composition according to claim 1, wherein particles comprising one or more resin selected from the polyphenylene sulfide resin (B), and the polyphenylene ether resin (C) are dispersed in the polymer compound having an ion exchange group (A), and the equivalent-circle average particle diameter of the particles is 1 μm or less.

10. A polymer electrolyte composition according to claim 3, wherein particles comprising one or more resin selected from the polyphenylene sulfide resin (B), the polyphenylene ether resin (C) and the epoxy group-containing compound (F) are dispersed in the polymer compound having an ion exchange group (A), and the equivalent-circle average particle diameter of the particles is 1 μm or less.

11. A polymer electrolyte composition according to claim 9, wherein the region allowing for dispersion of particles occupies from 50 to 100% in the entire region of the polymer electrolyte composition.

12. A proton exchange membrane comprising the polymer electrolyte composition described in any one of claims 1-8 and 9-11.

13. A proton exchange membrane according to claim 12, wherein the membrane has a thickness of 5 to 200 μm; the polymer compound having an ion exchange group (A) is a perfluorocarbon polymer compound having an ion exchange group; and the polyphenylene sulfide resin (B) and the polyphenylene ether resin (C) are melt-mixed under heating with a precursor of the perfluorocarbon polymer compound having an ion exchange group and then extrusion-molded, and the obtained film is saponified with an alkali and then acid-treated, thereby producing the proton exchange membrane.

14. A proton exchange membrane according to claim 12, wherein the membrane has a thickness of 5 to 200 μm; the polymer compound having an ion exchange group (A) is a perfluorocarbon polymer compound having an ion exchange group; the polyphenylene sulfide resin (B), the polyphenylene ether resin (C) and the epoxy group-containing compound (F) are melt-mixed under heating with a precursor of the perfluorocarbon polymer compound having an ion exchange group and then extrusion-molded, and the obtained film is saponified with an alkali and then acid-treated, thereby producing the proton exchange membrane.

15. A proton exchange membrane according to claim 13, wherein the extrusion molding is inflation molding.

16. A proton exchange membrane according to claim 12, which is stretched at a draw ratio of 1.1 to 6.0 times in the transverse direction (TD), at a draw ratio of 1.0 to 6.0 times in the machine direction (MD) and at an area draw ratio of 1.1 to 36 times.

17. A proton exchange membrane according to claim 12, wherein at least two proton exchange membranes differing in the compositional ratio of the polymer electrolyte composition are stacked.

18. A proton exchange membrane according to claim 17, wherein the polymer electrolyte composition comprises
(A) the polymer compound having an ion exchange group,
(B) the polyphenylene sulfide resin, (C) the polyphenylene ether resin and (F) the epoxy group-containing compound.

19. A proton exchange membrane according to claim 17, wherein
the proton exchange membrane is formed from at least three stacked layers,
at least one of the layers has a polymer electrolyte composition that differs from the polymer electrolyte composition of at least two other layers with regard to the content of the polymer compound having an ion exchange group (A), the at least three stacked layers include an inner layer and at least one surface layer, the inner layer has a lower ion exchange group (A) content than the at least one surface layer, and the layer thickness of the inner layer occupies from 5 to 90% of an entire layer thickness of the proton exchange membrane.

20. A proton exchange membrane according to claim 17, wherein the proton exchange membrane is formed from at least three stacked layers, at least one of the layers has a polymer electrolyte compositions that differs from the polymer electrolyte composition of at least two other layers with regard to the content of the polymer compound having an ion exchange group (A), the at least three stacked layers include an inner layer and at least one surface layer, the surface layer has a lower ion exchange group (A) content than the inner layer, and the thickness of the surface layer occupies from 5 to 50% of an entire layer thickness of the proton exchange membrane.

21. A proton exchange membrane according to claim 12, which comprises a reinforcing material comprising an inorganic or organic material.

22. A proton exchange membrane according to claim 21, wherein the reinforcing material is a staple fiber substance.

23. A proton exchange membrane according to claim 21, wherein the reinforcing material is a continuous support.

24. A membrane electrode assembly comprising the proton exchange membrane described in any one of claims 12 to 23.

25. A solid polymer electrolyte fuel cell comprising the membrane electrode assembly described in claim 24.

* * * * *

UNITED STATES PATENT AND TRADEMARK OFFICE
CERTIFICATE OF CORRECTION

PATENT NO. : 7,662,498 B2
APPLICATION NO. : 11/111965
DATED : February 16, 2010
INVENTOR(S) : Hiroshi Murata et al.

Page 1 of 1

It is certified that error appears in the above-identified patent and that said Letters Patent is hereby corrected as shown below:

Column 31, Lines 22-23, change "-$[CF_2CX^1X^2]_a$—$[CF_2$—$CF(-O-(CF_2X^3))_b$—$O_c$—$(CFR^1)_d$—$(CFR^2)_e$—$(CF_2)_f$—$X^4)]_g$" to -- -$[CF_2CX^1X^2]_a$-$[CF_2$-$CF(-O-(CF_2$-$CF(CF_2X^3))_b$-$O_c$-$(CFR^1)_d$-$(CFR^2)_e$-$(CF_2)_f$-$X^4)]_g$- --.

Column 33, Lines 12-13, change "compositions" to --composition--.

Signed and Sealed this

Eleventh Day of May, 2010

David J. Kappos
*Director of the United States Patent and Trademark Office*